(12) United States Patent
Uematsu et al.

(10) Patent No.: US 7,635,209 B2
(45) Date of Patent: Dec. 22, 2009

(54) LAMP FOR VEHICLE AND LAMP-MOUNTED VEHICLE

(75) Inventors: Hiroshi Uematsu, Wako (JP); Yoshiyuki Matsumoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 90 days.

(21) Appl. No.: 11/656,633

(22) Filed: Jan. 23, 2007

(65) Prior Publication Data

US 2007/0177398 A1    Aug. 2, 2007

(30) Foreign Application Priority Data

| Jan. 27, 2006 | (JP) | ............................. 2006-019328 |
| Feb. 14, 2006 | (JP) | ............................. 2006-036816 |
| May 30, 2006 | (JP) | ............................. 2006-149511 |

(51) Int. Cl.
*B60Q 1/00* (2006.01)

(52) U.S. Cl. .................... 362/493; 362/540; 362/544; 340/479

(58) Field of Classification Search ................. 362/493, 362/490, 35, 540, 542, 485, 543, 544, 545; 224/309; 340/472, 815, 479, 478, 468, 471; 40/592

See application file for complete search history.

(56) References Cited

U.S. PATENT DOCUMENTS

| 1,232,037 | A | * | 7/1917 | Jaminet | ........................ 40/592 |
| 2,073,159 | A | * | 3/1937 | William et al. | .............. 454/136 |
| 2,157,361 | A | * | 5/1939 | Lester | ......................... 362/493 |
| 2,270,377 | A | * | 1/1942 | McLauchlin | ................. 40/592 |
| 2,891,140 | A | * | 6/1959 | Putnam | ...................... 362/542 |
| 3,656,105 | A | * | 4/1972 | Steltzer et al. | .............. 362/548 |
| 4,081,788 | A | * | 3/1978 | Gaspar | ....................... 340/472 |
| 4,269,339 | A | * | 5/1981 | Bott | ........................... 224/325 |
| 4,787,665 | A | * | 11/1988 | Rich | ........................ 296/180.1 |
| 5,130,906 | A | * | 7/1992 | Lund | .......................... 362/485 |
| 5,211,466 | A | * | 5/1993 | Jarocki et al. | .............. 362/540 |
| 5,522,634 | A | * | 6/1996 | Stanesic et al. | ............. 362/485 |
| 5,560,701 | A | * | 10/1996 | Payne | ........................ 362/493 |
| 5,709,453 | A | * | 1/1998 | Krent et al. | ................. 362/496 |
| 6,095,663 | A | * | 8/2000 | Pond et al. | ................... 362/247 |
| 6,511,216 | B2 | * | 1/2003 | Strickland | ................... 362/542 |
| 6,568,748 | B2 | * | 5/2003 | Yoon | .......................... 296/210 |
| 6,705,745 | B1 | * | 3/2004 | Pederson | .................... 362/284 |
| 7,153,011 | B2 | * | 12/2006 | Shen et al. | ................... 362/510 |
| 7,237,932 | B2 | * | 7/2007 | Ter-Hovhannissian | ...... 362/485 |

FOREIGN PATENT DOCUMENTS

| JP | 61-160330 | 7/1986 |
| JP | 05-44682 | 6/1993 |
| JP | 10-119581 | 5/1998 |

* cited by examiner

*Primary Examiner*—Gunyoung T Lee
(74) *Attorney, Agent, or Firm*—Carrier, Blackman & Associates P.C.; William D. Blackman; Joseph P. Carrier

(57) ABSTRACT

The present invention provides a lamp for a vehicle provided to a forward inclined face of a roof of a vehicle. The forward inclined face inclines downward and forward of the vehicle from a top of the roof. The lamp for a vehicle is provided with a light emitting face at least on a top face thereof.

18 Claims, 19 Drawing Sheets

LAMP FOR VEHICLE AND LAMP-MOUNTED VEHICLE

Priority is claimed on Japanese Patent Application No. 2006-019328, filed Jan. 27, 2006, Japanese Patent Application No. 2006-036816, filed Feb. 14, 2006, and Japanese Patent Application No. 2006-149511, filed May 30, 2006, the contents of which are incorporated herein by reference.

BACKGROUND OF THE INVENTION

1. Field of the Invention

The present invention relates to a lamp for a vehicle such as a brake lamp and sidelight for a vehicle, and also relates to a lamp-mounted vehicle equipped with the same.

2. Description of the Related Art

Recently, technologies are developed for effectively attracting attentions of a coming vehicle and a following vehicle while in a braking operation of a present vehicle, by providing brake lamps to a front face and to a rear spoiler of the present vehicle in addition to providing to a rear panel of the present vehicle (for example, refer to Japanese Utility Model Application No. H05-44682 and Japanese Unexamined Patent Application, First Publication No. S61-160330).

However, in these conventional lamp-mounted vehicles, each lamps is provided so as to be visible only from one of the forward and the rearward of the vehicle; therefore, in on order to obtain attracting effects of the lamps in both of the forward and rearward of the present vehicle, it was necessary to provide both of a front lamp and a rear lamp to the vehicle. Therefore, it was concern that this would increase the number of lamps equipped to the vehicle, and would increase manufacturing cost and weight of the vehicle. In addition, in the conventional lamp-mounted vehicle, the lamps did not have a function for recognizing the present vehicle itself (i.e., the vehicle width or the like).

In addition, a small vehicle or the like had a tendency in which the visibility thereof decreases when a vehicle such as a heavy-duty truck, a trailer, or the like, in which a view point of a driver therein becomes comparatively higher (herein after "high-view point vehicle") approaches from behind, and when the small vehicle hides under the view point of the driver in the high-view point vehicle who keeps watching ahead. In such situation, the attracting effect for warning by the lamps such as the brake lamp provided on a rear end of the small vehicle will not work sufficiently. Therefore, it has been desirable to provide a countermeasure which enables making the driver in the high-view point vehicle reliably recognize the present vehicle.

Accordingly, the present invention has an object of providing a lamp for a vehicle and a vehicle equipped with the same, which enables reduction in the number of lamps while improving the attracting performance of the lightening lamp by enabling reliable recognition of the lightening common lamp which is visible from both of the forward and the rearward of the present vehicle.

In addition, in the conventional lamp for a vehicle, attracting attentions around the present vehicle are made by a lightening light source inside a lamp housing; therefore, in order to have reliable visibility of the lightening in the daytime, dusk, or the like, it was necessary to increase the amount of light from the light source. In order to increase the amount of the light from the light source, it is necessary to increase a supply power to the light source; however, it was not desirable in the view point of power saving of the vehicle.

Accordingly, the present invention also has an object of providing a lamp for a vehicle and a vehicle equipped with the same, which enables obtaining sufficiently high attention-attracting effect without increasing the number of parts and without increasing power consumption.

SUMMARY OF THE INVENTION

The present invention employed the followings in order to achieve the above-mentioned objects.

That is, the present invention provides a lamp for a vehicle provided to a forward inclined face of a roof of a vehicle. The forward inclined face inclines downward and forward of the vehicle from a top of the roof. The lamp for a vehicle is provided with a light emitting face at least on a top face thereof.

The lamp for a vehicle may further include: a light source which emits a light toward an exterior of the vehicle; and a light-guiding member which guides and irradiates an inputted external light to a first predetermined direction around the vehicle.

It may be arranged such that: a light-irradiating direction of the light from the light source is directed to a second predetermined direction; and the first predetermined direction of the external light guided by the light-guiding member is directed so as to be the same direction as the second predetermined direction.

The lamp for a vehicle may further include: a first illuminating portion which irradiates a light rearward in relation to a vehicle advancing direction; and a second illuminating portion which irradiates a light other than rearward.

The lamp for a vehicle may further include a member which is provided thereinside and demarcates between the first illuminating portion and the second illuminating portion.

The lamp for a vehicle may further include a limiting portion which limits a light-irradiating region of the first illuminating portion or the second illuminating portion.

The lamp for a vehicle may further include a polarizing device which changes an intensity of the light emitted from the first illuminating portion or the second illuminating portion, in accordance with irradiation angles.

Intensities or colors of the first illuminating portion and the second illuminating portion may differ from each other.

The first illuminating portion and the second illuminating portion may be lightened independently from each other.

The lamp for a vehicle may further include a light-illuminating portion which directs a light to a side direction of the vehicle.

The light-illuminating portion may be formed in a linear shape.

At least a height of a top of the lamp for a vehicle while being attached to the vehicle may be set so as to be lower than a rooftop of the vehicle.

The lamp for a vehicle may further include a transparent covering member provided on a top face of the lamp for a vehicle.

It may be arranged such that a top face of the lamp for a vehicle and a surface of the roof are formed so as to have the same height, and so as to form a rooftop face by continuously arranging the lamp for a vehicle onto the roof.

The present invention also provides a lamp-mounted vehicle, including the above lamp for a vehicle which is provided in a groove for attaching a roof molding.

DETAILED DESCRIPTION OF THE INVENTION

Each embodiment of the present invention will be explained below with reference to the drawings.

A First Embodiment

Figure 1:
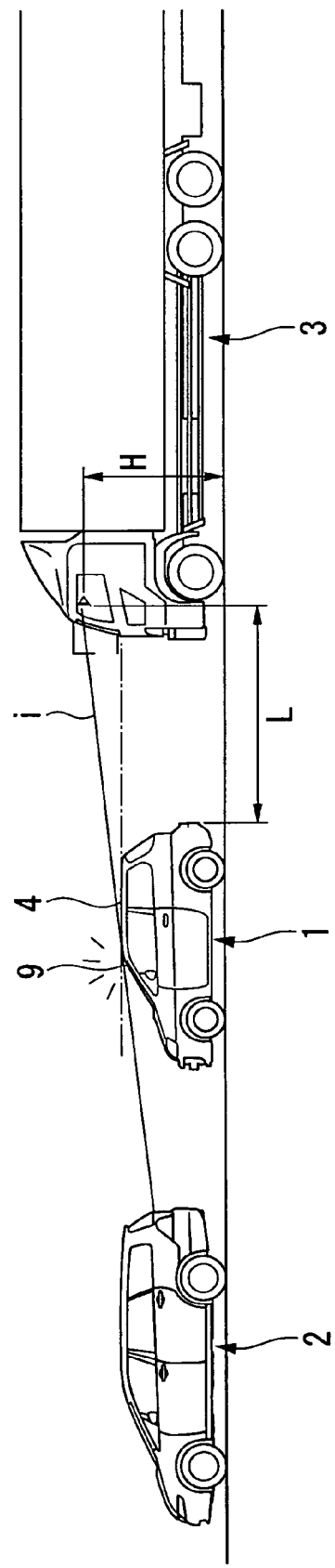
FIG. 1 shows a side view of a lamp-mounted vehicle equipped with a lamp for a vehicle according to a first embodiment of the present invention.

FIG. 1 shows a lamp-mounted vehicle 1 equipped with a lamp for a vehicle according to a first embodiment of the present invention, wherein the lamp-mounted vehicle 1 is running on a road while being sandwiched between a preceding standard vehicle 2 and a following heavy-duty truck 3. The reference symbol "i" in FIG. 1 denotes a line of sight of a driver in the heavy-duty truck 3 when the further preceding standard vehicle 2 comes into a front field of view of the driver in the heavy-duty truck 3, over a roof of the preceding lamp-mounted vehicle 1. A driver's seat of the heavy-duty truck 3 is sufficiently higher than those of the standard vehicle 2 and the like; therefore, the height H of the line of sight of the driver in the driver's seat becomes sufficiently high.

Figure 2:
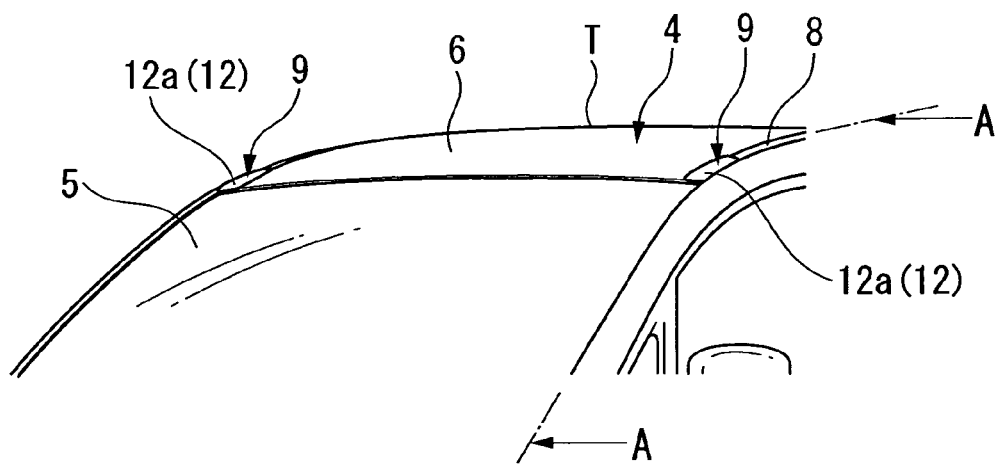
FIG. 2 shows a perspective view of the lamp-mounted vehicle seen from the forward and the upward.
Figure 3:
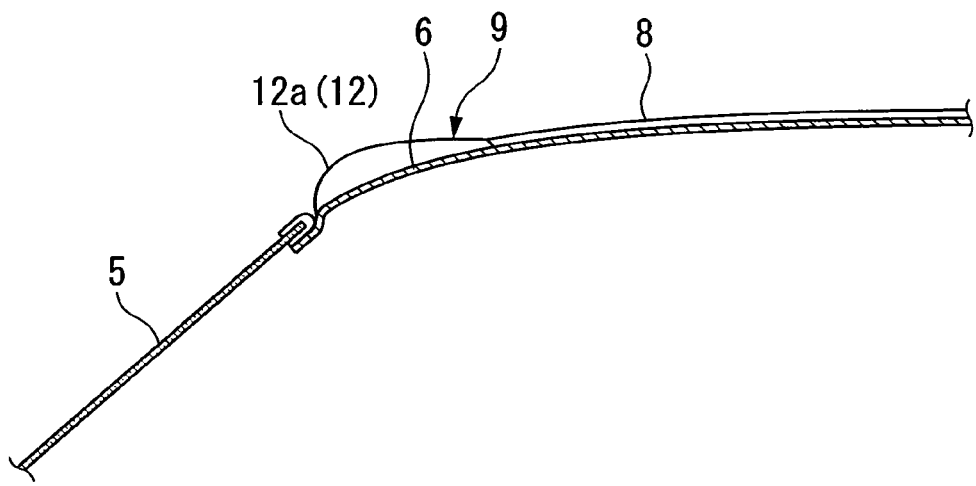
FIG. 3 shows a cross-sectional view of the lamp-mounted vehicle taking along the line A-A of FIG. 2.
Figure 7:
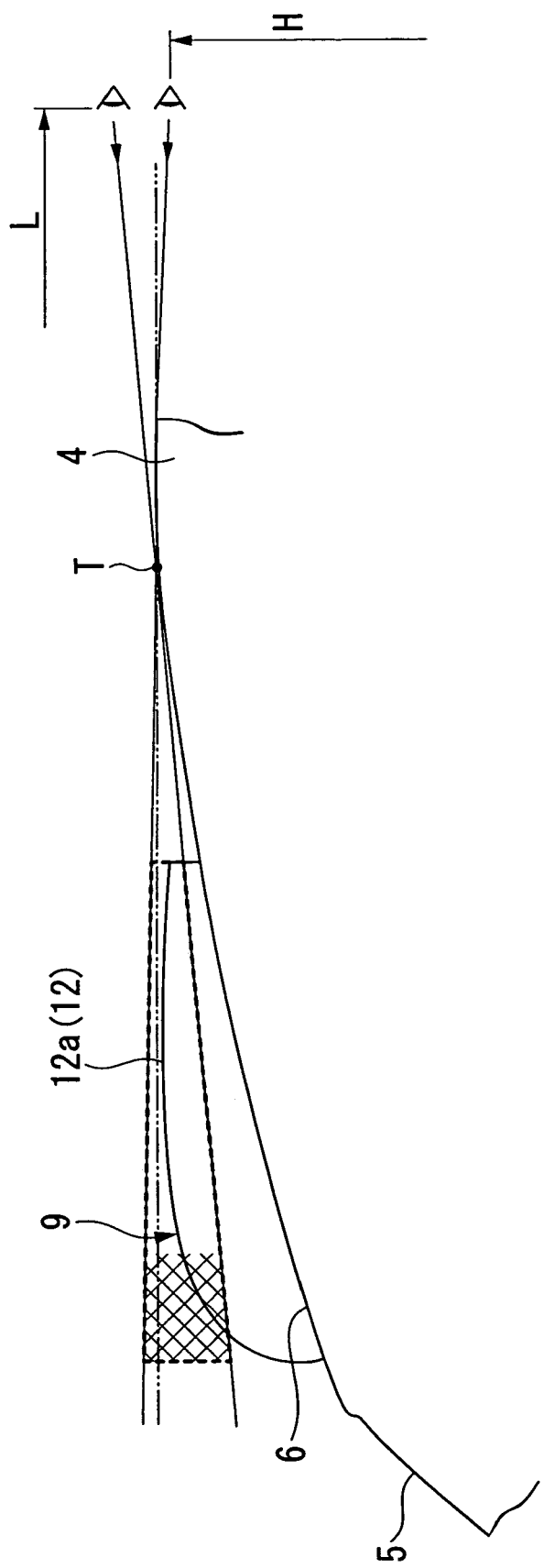
FIG. 7 schematically shows a side view of a vehicle roof portion of the lamp-mounted vehicle.

As shown in FIG. 7, a roof 4 of the lamp-mounted vehicle 1 protrudes upward at most at a substantially center position thereof in the vehicle length direction, and this most protruding portion forms a top portion T of the roof 4. As shown in FIGS. 2 and 7, a forwarder side than the top portion T of the roof 4 inclines forwardly and downwardly in the vehicle length direction to a window glass 5; and this inclining face forms a roof forward side inclining face 6 of the present invention.

Roof-molding attaching grooves 7 are formed along the vehicle length direction at both sides in the vehicle width direction of the roof 4. A resin-made roof molding 8 is attached into each of the roof-molding attaching grooves 7. A lamp unit 9 (a lamp) is unitarily provided at a front end portion of the roof molding 8. While attaching the roof molding 8 into the roof-molding attaching groove 7, the lamp unit 9 is attached into a front end portion of the roof-molding attaching groove 7 together with the roof molding 8.

Figure 4:
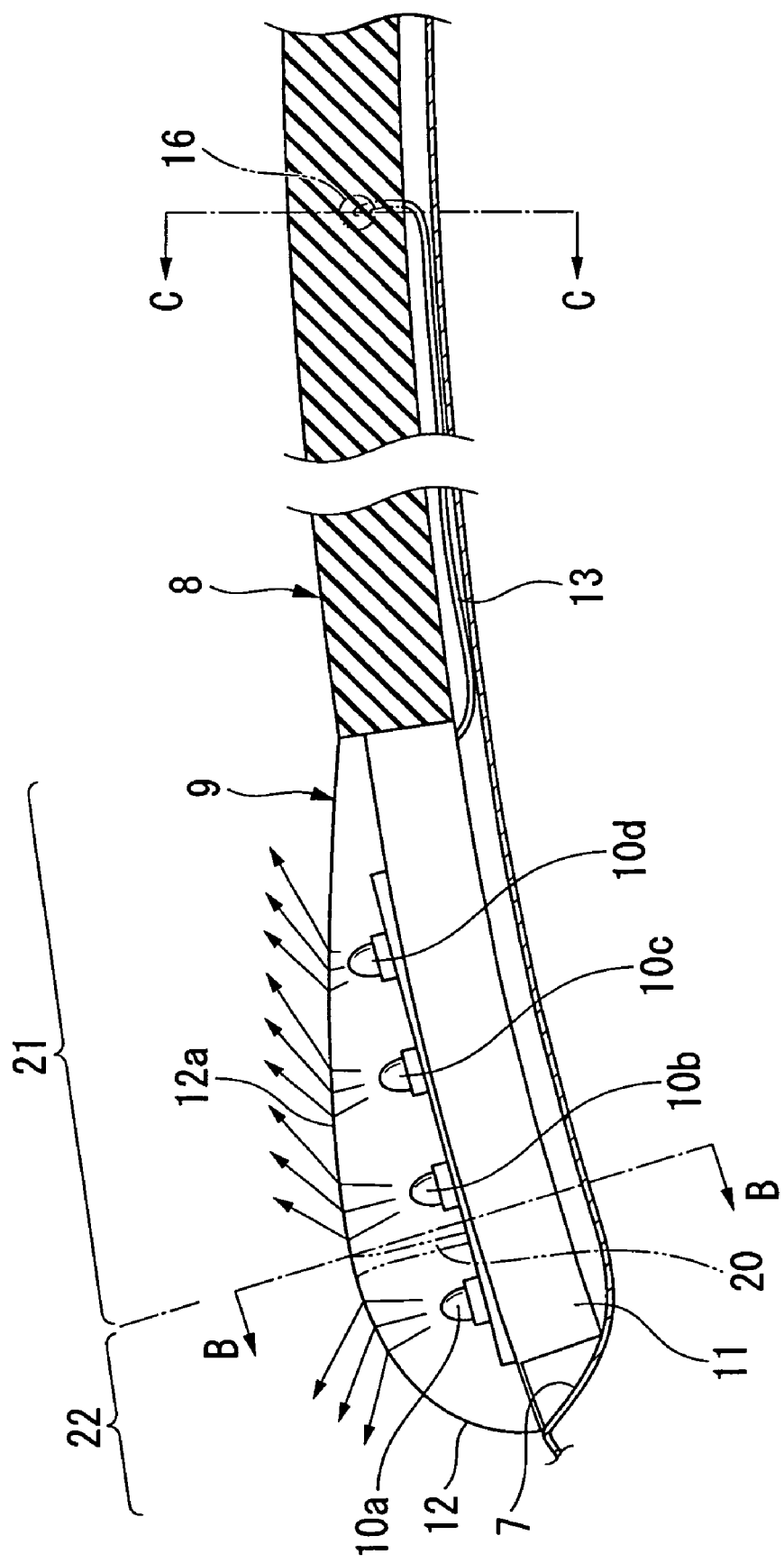
FIG. 4 shows an enlarged cross-sectional view of the lamp-mounted vehicle shown in FIG. 3.
Figure 5:
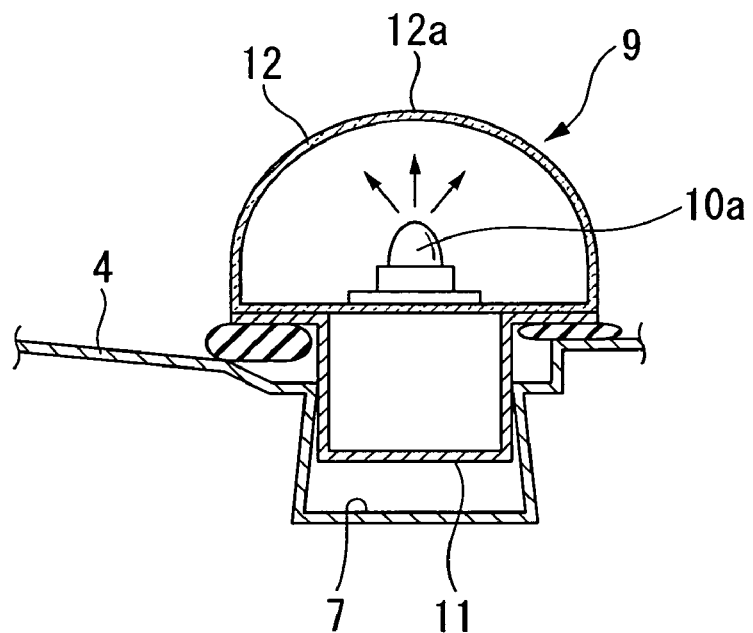
FIG. 5 shows a cross-sectional view of the lamp-mounted vehicle taking along the line B-B of FIG. 4.
Figure 6:
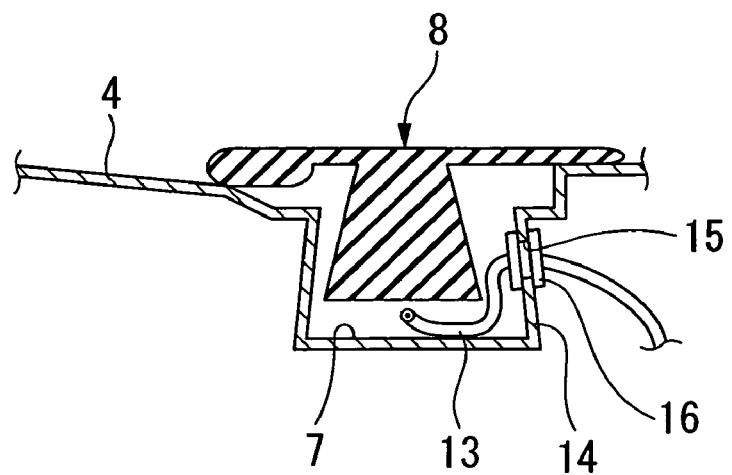
FIG. 6 shows a cross-sectional view of the lamp-mounted vehicle taking along the line C-C of FIG. 4.

As shown in FIGS. 4 and 5, the lamp unit 9 is provided with: a plurality of lamps 10a to 10d which are arranged in the vehicle length direction; a circuit-mounting portion 11 in which a circuit member for illuminating the lamps 10a to 10d is mounted; and a lamp cover 12 which covers a top of the circuit-mounting portion 11 and protrudes from the roof-molding attaching groove 7 to emerge to the cabin exterior side. The lamp unit 9 of the present embodiment works as a sidelight which can be illuminated upon an operation of a switch by a driver in the driver's seat.

The lamp cover 12 is made of a transparent resin material in which a forward portion thereof is colored in amber while a rear portion thereof is colored in red. An upper face of the lamp cover 12 is formed so as to be continuous with a front end portion of the roof molding 8, and extends forward in the vehicle direction. As shown in FIG. 5, the lamp cover 12 is formed in a substantially semicircular shape on a cross section along the vehicle width direction. As shown in FIG. 4, the cross-sectional shape of the lamp cover 12 mounted on the lamp-mounted vehicle 1 is formed such that: a top portion thereof substantially extends horizontally toward a forward edge portion thereof; and the forward edge portion bends downwardly so as to form a spherical shape which substantially meets an opening shape of a front end portion of the roof-molding attaching groove 7. Other shapes are also applicable if only at least the upper face of the lamp cover 12 forms a light emitting face (i.e., if only the lamp cover 12 is made of transparent materials). In the present embodiment, the lamp cover 12 is entirely formed in a solid and round shape, and an entire of the exterior thereof including a front face and side faces forms a light emitting face 12a.

Interior cutting face in the lamp cover 12 is designed such that the lamp cover 12 illuminates light emitted from the most front lamp 10a mainly in the forward of the vehicle, and also illuminates light emitted from the remaining three behind lamps 10b to 10d mainly in the rearward of the vehicle.

In the present embodiment, an inclination of the roof forward side inclining face 6, the mounting position of the lamp unit 9 (i.e., the mounting position of the lamp cover 12), the height of the protruding upper face of the lamp unit 9 (i.e., the height of the protruding upper face of the lamp cover 12), and the like, are defined so as to satisfy the following requirements (a) and (b) (also refer to FIGS. 1 and 7).

When the height of the view point of a driver in the following vehicle positioned at a predetermined distance L (within a range from 10 m to 30 m. For example, 20 m) behind from the lamp-mounted vehicle 1 is less than the setting height H, the light emitting face 12a of the lamp unit 9 is hidden by the top portion T of the roof 4 from the field of view i of the driver in the following vehicle.

(b) When the height of the view point of a driver in the following vehicle positioned at a predetermined distance L (within a range from 10 m to 30 m. For example, 20 m) behind from the lamp-mounted vehicle 1 is equal to or higher than the setting height H, the light emitting face 12a of the lamp unit 9 is not hidden by the top portion T of the roof 4, and is therefore visible within the field of view i of the driver in the following vehicle. In this case, the visible portion of the lamp unit 9 can be indicated by a cross-hatching portion shown in FIG. 7.

The setting height H is set so as to be higher than the average height of a view point of a driver seated in the driver's seat of the standard vehicle. Therefore, when the following vehicle approaches the predetermined distance L from the lamp-mounted vehicle 1, if the following vehicle is a standard vehicle, the driver in the following vehicle will not see the light emitting face 12a of the lamp unit 9. On the other hand, if the following vehicle is a high-view point vehicle such as a heavy-duty truck, the driver in the following vehicle can reliably see the light emitting face 12a of the lamp unit 9.

As explained in the above, the lamp unit 9 is unitarily provided into the front end portion of the roof molding 8. An electric cable 13 extending from the circuit-mounting portion 11 of the lamp unit 9 is routed along an inside of the roof-molding attaching groove 7 to a position near the top portion T, and then penetrates a side wall 14 so as to be routed into the cabin interior. A penetration hole 15 for routing the electric cable 13 is formed in the side wall 14 which forms the roof-molding attaching groove 7. The electric cable 13 is fittingly inserted into the penetration hole 15 via a grommet 16.

Since the lamp-mounted vehicle 1 of the present embodiment has the above-explained construction, when the lamp unit 9 is turned on, if the heavy-duty truck 3 approaches from the behind to reach within the predetermined distance L as shown in FIG. 1, the illuminating lamp unit 9 on the roof forward side inclining face 6 will be within a field of view of the driver in the heavy-duty truck 3; therefore, it is possible to strongly attract an attention of the driver in the heavy-duty truck 3 by the illuminating lamp unit 9. In the case of the heavy-duty truck 3 or the like in which a driver's view point becomes higher than a roof of the standard vehicle, a line of sight of the driver in the high view point vehicle reaches a rear lamp and the like of the further preceding vehicle running in front of the direct preceding vehicle, over the roof of the direct preceding vehicle. In especially, in the lamp-mounted vehicle 1 of the present embodiment, since the lamp unit 9 is arranged on the front end portion of the roof 4 where is within the line of sight i of the driver in the following vehicle, it is possible to reliably make the driver in the following vehicle recognize the present vehicle by the illuminating lamp unit 9.

In the lamp-mounted vehicle 1 of the present embodiment, the lamp unit 9 is arranged on the roof forward side inclining face 6 which inclines forward from the top portion T of the roof 4, and the forward portion and the upper portion of the lamp unit 9 are visible from the preceding vehicle; therefore, the illuminating lamp unit 9 arranged at the high position (i.e., the roof 4) can be identified reliably from the preceding vehicle. Accordingly, the existence of the lamp-mounted vehicle 1 can be recognized reliably by the preceding vehicle, a coming vehicle, a pedestrian, and the like.

Furthermore, in the lamp-mounted vehicle 1 of the present embodiment, since the lamp unit 9 is installed into the roof-molding attaching grooves 7 on the both sides of the roof 4, the lamp units 9 after being installed will not largely protrude upward from the roof 4, and thereby the appearance quality of the lamp-mounted vehicle 1 will be improved. In addition, since the lamp unit 9 can be inserted utilizing the roof-molding attaching grooves 7 without any modifications while installing the lamp units 9, the installation can be made easily. Furthermore, electrical lines of the lamp unit 9 can be connected easily in the roof-molding attaching groove 7.

In addition, in the present embodiment, the electric cable 13 of the lamp unit 9 is routed along the roof-molding attaching groove 7 to the position near the top portion T of the roof 4, and is extracted into the cabin interior at the position near the top portion T. Therefore, rainwater and the like can be prevented more effectively from getting into the backside of the roof 4 through the penetration hole 15 which is used for extracting the electric cable 13.

In addition, in the lamp-mounted vehicle 1 of the present embodiment, the lamp unit 9 is formed unitarily with the roof molding 8 such that the external face thereof becomes substantially continuous with the external face of the roof molding 8. With this construction, the design performance of the lamp unit 9 when mounting it on the lamp-mounted vehicle 1 will be improved. In addition, the running resistance can be decreased, and the generation of whistling sound while running can be prevented.

Moreover, in the lamp-mounted vehicle of the present embodiment, the most front lamp 10a mainly illuminates the forward of the vehicle, while the other remaining three behind lamps 10b to 10d mainly illuminate the rearward of the vehicle; however, as indicated by imaginary lines in FIG. 4, by providing a separation wall 20 in the lamp unit 9, the inside of the lamp unit 9 may be divided into a first illuminating portion 21 located behind the separation wall 20 for illuminating the rearward and a second illuminating portion 22 located in front of the separation wall 20 for illuminating the forward.

Like this, in the case in which the inside of the lamp unit 9 is clearly divided into the first illuminating portion 21 and the second illuminating portion 22, by further providing a directive reflector or the like, it is possible to improve the illumination efficiency in order to further improve the visibility of the lamp unit 9.

In addition, in the case in which the inside of the lamp unit 9 is clearly divided into the first illuminating portion 21 and the second illuminating portion 22, colors, intensities, illuminating patterns, or the like of lights emitted from the first illuminating portion 21 and the second illuminating portion 22 may differ from each other. For example, in the above embodiment, each of the lamps 10a to 10d of the lamp unit 9 illuminates continuously; however, it may be arranged such that the lamp 10a in the first illuminating portion 21 illuminates continuously while the lamps 10b to 10d in the second illuminating portion 22 illuminate blinkingly.

Furthermore, in the case in which colors, intensities, illuminating patterns, or the like of lights emitted from the first illuminating portion 21 and the second illuminating portion 22 differ from each other, it is possible to provide to the single lamp unit 9 with the different functions or the different visual effects between the view from the forward side of the lamp unit 9 and the view from the rearward side of the lamp unit 9. Accordingly, in this case, it is possible to reduce the number of parts and to improve the design performance of the lamp unit 9, comparing to arranging a plurality kinds of lamp units each having single function.

Figure 8:
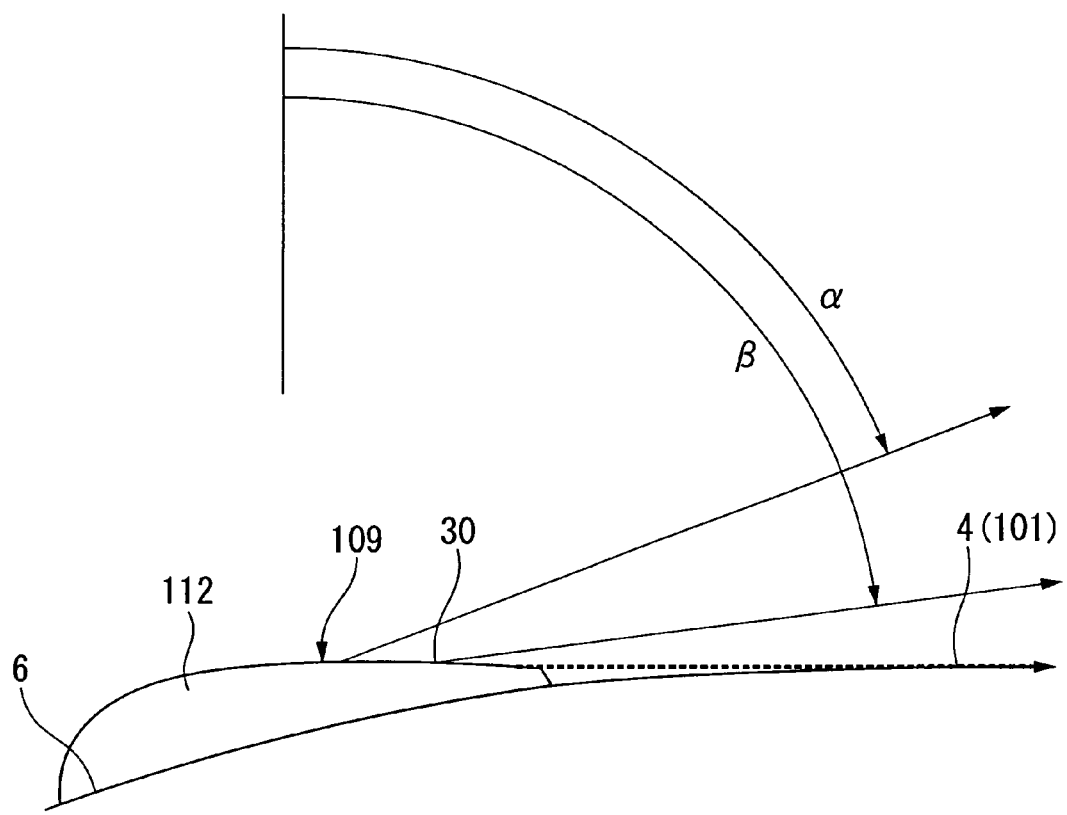
FIG. 8 shows a variant example of the lamp for a vehicle, schematically showing a side view of the vehicle roof portion.

Next, a variant example of the lamp for a vehicle will be explained below with reference to FIG. 8.

In a lamp-mounted vehicle 101 of the present embodiment, the way of arranging a lamp unit 109 onto the roof 4 is the same as that of the above-mentioned first embodiment. In the present variant example, constructions and functions of a lamp cover 112 of the lamp unit 109 differ from those of the lamp cover 12 of the first embodiment.

That is, the lamp cover 112 of the present variant example is provided with a polarizing lens 30 (a polarizing device) in order to change the illumination intensity depending on the visual angles seen from the outside thereof. In the present variant example, at the viewing angle from the rearward and the upward of the lamp unit 109 within a range of the setting angles α to β, substantially all of the illumination light will be transmitted, while at the viewing angle from the rearward and upward of the lamp unit 109 exceeding the setting angle β, the most of the illumination light is shaded by the polarizing lens 30.

In the lamp-mounted vehicle 101 equipped with this lamp unit 109, when a high-view point vehicle such as a heavy-duty truck approached from the behind, until the viewing angle of the lamp unit 109 seen from the high-view point vehicle is equal to or less than the setting angle β, the light having the low illumination intensity is visible from a driver in the high-view point vehicle by an operation of the polarizing lens 30. Then, when the high-view point vehicle approaches the lamp-mounted vehicle 101 to reach within a predetermined distance from the lamp-mounted vehicle 101, and a viewing angle of the lamp unit 109 seen from the high-view point vehicle becomes within a range of the setting angles α to β, the light having the high illumination intensity suddenly becomes visible from a driver in the high-view point vehicle.

Accordingly, in this lamp-mounted vehicle 101, the illumination intensity of the lamp unit 109 increases step by step in accordance with the approaching distance of the high-view point vehicle in relation to the lamp-mounted vehicle 101. And, if the approaching distance becomes equal to or less than the predetermined distance, it becomes possible to attract the high attention of the driver in the high-view point vehicle by the high illumination intensity light emitted from the lamp unit 109.

In the present variant example, the illumination intensity was changed in accordance with the viewing angle by the polarizing lens 30 provided in the lamp unit 109; however, it may be arranged such that the color of the transmitted light changes depending on the viewing angle, or such that the illumination light is completely shaded when the viewing angle from the upside thereof exceeds the setting angle.

Moreover, the present invention will not be limited only to the above-mentioned first embodiment and the variant example. Additions, omissions, substitutions, and other modifications can be made without departing from the spirit or scope of the present invention. For example, in the first embodiment and the variant example, the lamp (the lamp unit 9 or 109) is turned on by a switching operation of the driver in the driver's seat; however, the lamp may be turned on in connection with a stepping operation on a brake pedal. Furthermore, in the first embodiment and the variant example, the lamp (the lamp unit 9 or 109) is mounted in the roof-molding attaching groove 7; however, the lamp may be mounted on the locations other than roof-molding attaching groove 7 within the roof forward side inclining face 6.

The present invention explained in the above can be summarized below.

A lamp-mounted vehicle of the present invention is provided with a lamp (the lamp unit 9) having a light emitting face (the light emitting face 12a) at least on a top face thereof, on a roof forward side inclining face (the roof forward side inclining face 6) which inclines downward in the forward of the vehicle direction from a top (the top portion T) of a vehicle roof (the roof 4).

According to the lamp-mounted vehicle, the light emitted from the light emitting face of the lamp is visible from the forward of the vehicle, while in the rearward of the vehicle, the light emitted from the light emitting face of the lamp is visible from a driver in a following high-view point vehicle when the light emitting face is not hidden from the line of view of the driver in the following high-view point vehicle, by the top portion of the vehicle roof.

Therefore, by providing the lamp having the light emitting face at least on the top face thereof, on the roof forward side inclining face, the sufficient height of the lamp can be secured, and thereby enabling a preferable visibility from the forward of the vehicle, and also enabling the visibility of the light emitting face from the rearward in the vehicle direction under the condition in which the light emitting face is not hidden by the top portion of the vehicle roof. Accordingly, it is possible to make the drivers in the preceding vehicle and the following vehicle reliably recognize the present vehicle (the lamp-mounted vehicle) and to attract their attentions, by lightening the common lamp.

In the lamp-mounted vehicle according to the above (1), the light emitting face formed on the top face of the lamp is hidden by the top of the vehicle roof from the field of view when the height of view point at the predetermined distance (the predetermined distance L) behind from the present vehicle is less than the setting height (the setting height H), while the light emitting face is visible when the height of view point at the predetermined distance behind from the present vehicle becomes equal to or higher than the setting height.

According to the lamp-mounted vehicle, the light emitted from the lamp becomes visible from the following vehicle when the following vehicle approaches and if the following vehicle is a high-view point vehicle such as a heavy-duty truck in which the height of the viewpoint of a driver in the driver's seat is equal to or higher than the setting height. In addition, when the following vehicle approaches from the behind, if the height of the view point of the driver in the driver's seat is lower than the setting height, the light emitting face of the lamp is hidden by the top of the vehicle roof and is therefore invisible from the following vehicle.

Accordingly, since the illumination of the lamp is visible only when the high-view point vehicle in which the height of the view point of the driver in the driver's seat is equal to or higher than the predetermined height approaches from the behind, it is possible to highly attract attention to the driver in the approaching high-view point vehicle.

In the lamp-mounted vehicle according to the above (1) or (2), the lamp is provided with: a first illuminating portion (the first illuminating portion 21) which emits light rearward in the vehicle advancing direction; and a second illuminating portion (the second illuminating portion 22) which emits light forward.

According to the lamp-mounted vehicle, it is possible to efficiently emit lights from each of the first illuminating portion for illuminating the rearward of the present vehicle and the second illuminating portion for illuminating the forward of the present vehicle.

Accordingly, since the lights can be emitted independently by the first illuminating portion for illuminating the rearward and the second illuminating portion for illuminating the forward, the illumination efficiency of the lights can be increased in both directions, and thereby improving the visibility of the lamp.

In the lamp-mounted vehicle according to one of the above (1) to (3), illumination light from the first illuminating portion and illumination light from the second illuminating portion differ from each other.

Specifically, for example, it may be arranged such that the first illuminating portion emits blinking red light while the second illuminating portion emits white or amber light. In this case, it is possible to realize different functions and the visual effects between the views from the forward and the rearward of the present vehicle.

Accordingly, by employing different illumination lights between the first illuminating portion and the second illuminating portion, a plurality of different functions and the visual effects can be achieved by single lamp.

In the lamp-mounted vehicle according to one of the above (1) to (4), the lamp is provided with a polarizing device (the polarizing lens 30) which changes the illumination intensity of the light depending on the viewing angle in the vertical direction when the lamp is seen from the rearward of the present vehicle.

According to the lamp-mounted vehicle, it is possible to set the polarizing device such that, for example, the illumination intensity decreases when the viewing angle seen from the upward with respect to the light emitting face provided on the top face of the lamp exceeds the setting angle, while the illumination intensity increases when the viewing angle reaches within the setting angle. In the case in which the polarizing device is arranged like this, the high-intensity illumination light can be viewed by a driver in the following vehicle only when the high-view point vehicle (the following vehicle) approaches from the rearward and reaches within the predetermined distance from the present vehicle.

Accordingly, since the illumination intensity of the light changes depending on the viewing angle in the vertical direction seen from the rearward of the present vehicle, when the high-view point vehicle such as a heavy-duty truck approaches from the rearward, it is possible to reliably attract attention of the driver in the high-view point vehicle by the high-intensity illumination light.

In the lamp-mounted vehicle according to one of the above (1) to (5), a roof-molding attaching groove (the roof-molding attaching groove 7) is provided on the vehicle roof, and the lamp is mounted in the roof-molding attaching groove.

According to the lamp-mounted vehicle, the lamp can be mounted easily on a vehicle body without deteriorating the appearance quality of the vehicle body.

Accordingly, since the lamp is mounted in the roof-molding attaching groove, the appearance quality of the lamp mounted on the vehicle can be improved, and mounting operation of the lamp can be easier. In addition, since the wirings from the lamp can be routed in the roof-molding attaching groove, routing operation can be made easier and the deterioration in the appearance thereof can be prevented. Furthermore, since a part of the lamp is inserted into the roof-molding attaching groove, a portion protruding from the roof can be small and thereby enabling making it compact. Furthermore, since the center of gravity of the lamp can be lower, the lamp will hardly be affected by the vibrations of the vehicle body.

In the lamp-mounted vehicle according to (5), the lamp is formed so as to be substantially continuous with the upper face of the roof molding (the roof molding 8).

According to the lamp-mounted vehicle, the appearance of the lamp is united with that of the roof molding; therefore, while the present vehicle is running, air stream from the lamp to the roof molding will flow smoothly.

Accordingly, since the lamp is formed so as to be substantially continuous with the upper face of the roof molding, the design performance of the vehicle roof can be improved, and furthermore, the reduction in running resistance and preventing the generation of whistling sound can be achieved.

EXPLANATIONS FOR THE REFERENCE SYMBOLS

1 ... a lamp-mounted vehicle; 4 ... a roof (vehicle roof); 6 ... a roof forward side inclining face; 7 ... a roof-molding attaching groove; 8 ... a roof molding; 9, 109 ... a lamp unit (a lamp); 21 ... a first illuminating portion; 22 ... a second illuminating portion; 30 ... a polarizing lens (a polarizing device); T ... a top portion; L ... a predetermined distance; and H ... a setting height.

A Second Embodiment

A second embodiment of the present invention will be explained below with reference to FIGS. 9 to 13. Moreover, an arrow FW in the drawings indicates the forward in the vehicle direction.

Figure 9:
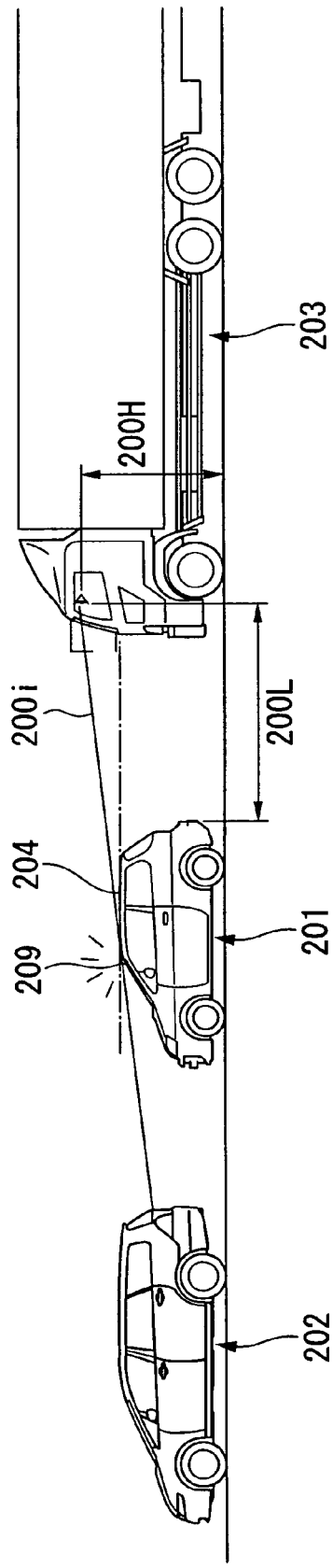
FIG. 9 shows a side view of a lamp-mounted vehicle according to a second embodiment of the present invention.

FIG. 9 shows a vehicle 201 (hereinafter "lamp-mounted vehicle 201") equipped with a lamp for a vehicle 209 (hereinafter "lamp 209") according to the present embodiment, wherein the lamp-mounted vehicle 201 is running on a road while being sandwiched between a preceding standard vehicle 202 and a following heavy-duty truck 203. The reference symbol "200*i*" in FIG. 9 denotes a line of sight of a driver in the heavy-duty truck 203 when the further preceding standard vehicle 202 comes into a front field of view of the driver in the heavy-duty truck 203, over a roof of the preceding lamp-mounted vehicle 201. A driver's seat of the heavy-duty truck 203 is sufficiently higher than those of the standard vehicle 202 and the like; therefore, the height 200H of the line of sight of the driver in the driver's seat becomes sufficiently high.

Figure 10:
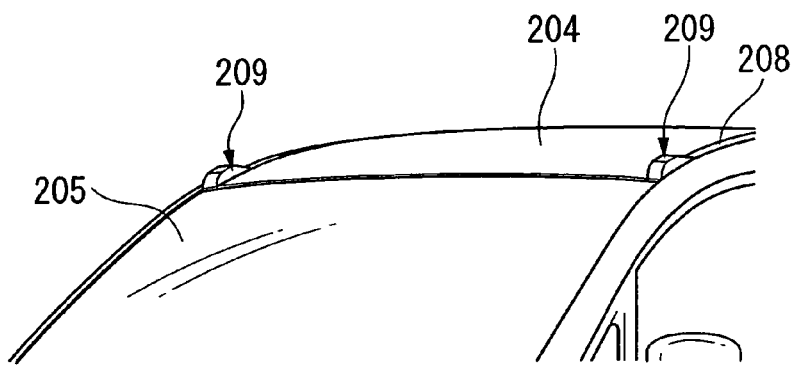
FIG. 10 shows a perspective view of the lamp-mounted vehicle seen from the forward and the upward.

A roof 204 of the lamp-mounted vehicle 201 protrudes upward at most at a substantially center position thereof in the vehicle length direction, and this most protruding portion forms a top portion of the roof 204. As shown in FIG. 10, a forwarder side than the top portion of the roof 204 inclines forwardly and downwardly in the vehicle length direction to a window glass 205.

Figure 11:
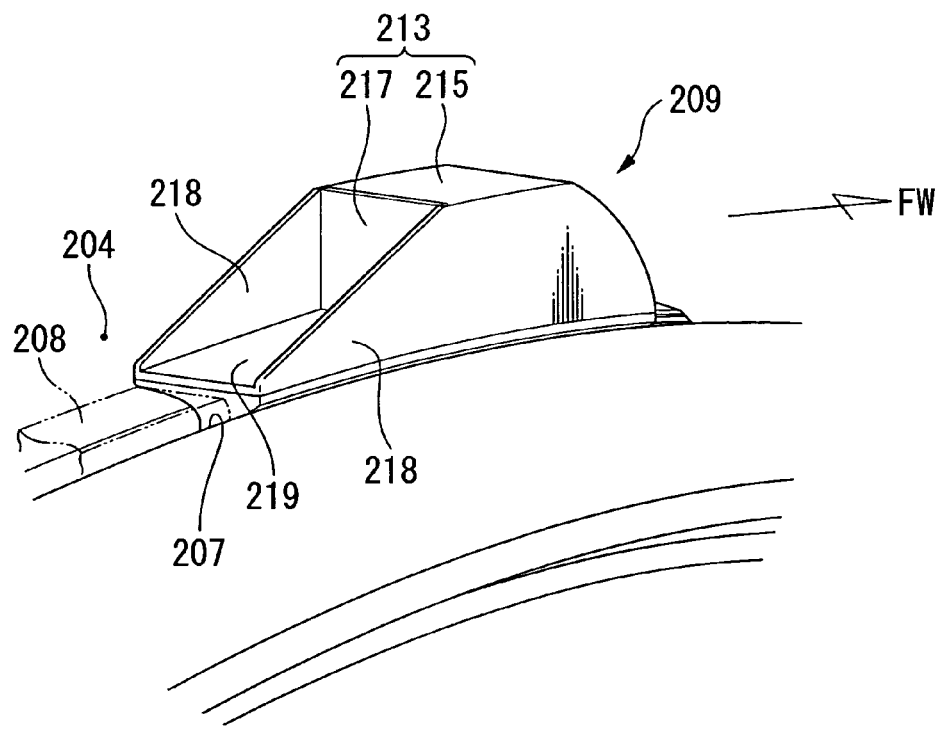
FIG. 11 shows an enlarged perspective view of a lamp portion of the lamp-mounted vehicle, seen from the rearward and the upward on the right side.

As shown in FIG. 11, roof-molding attaching grooves 207 are formed along the vehicle length direction at both sides in the vehicle width direction of the roof 204. A resin-made roof molding 208 is attached into each of the roof-molding attaching grooves 207. The resin-made roof molding 208 and the lamp 209 are together attached into each of the roof-molding attaching grooves 207. The lamp 209 of the present embodiment works as a sidelight which can be illuminated upon an operation of a switch by a driver in the driver's seat.

Figure 13:
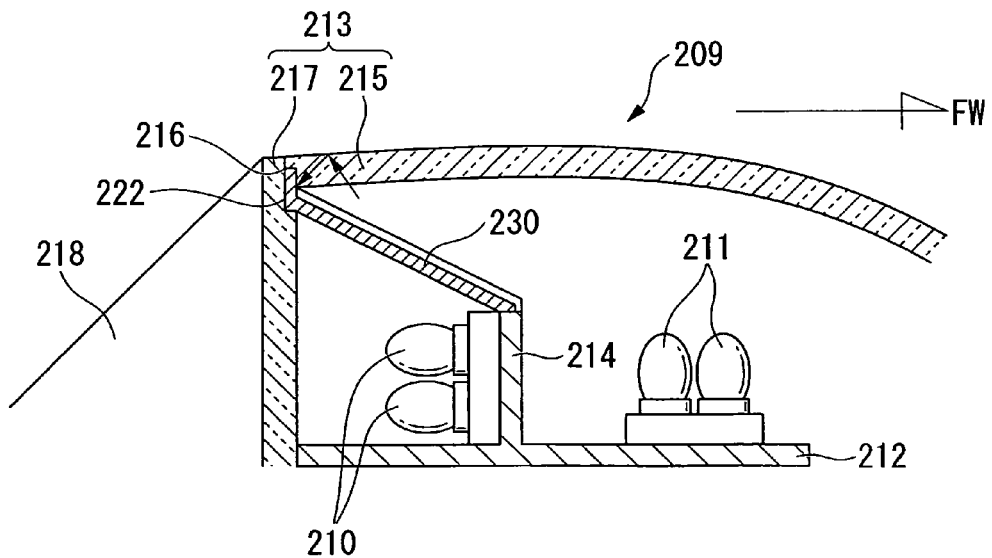
FIG. 13 shows an enlarged cross-sectional view of the lamp portion, taking along the line D-D of FIG. 12.

As shown in FIGS. 11 and 13, the lamp 209 is provided with: a rear lamp 210 for irradiating the rearward of the present vehicle; a front lamp 211 for mainly irradiating the forward of the present vehicle; a lamp base 212 which supports the rear lamps 210, the front lamps 211, and a circuit member for illuminating these, and is attached into the roof-molding attaching groove 207; and a lamp cover 213 which is attached on the upper side of the lamp base 212 to cover the above and therearound of the rear lamps 210 and the front lamps 211. In the present embodiment, an LED having the high luminous intensity is employed for the rear lamps 210 and the front lamps 211. The irradiating direction of the rear lamps 210 is directed rearward in the vehicle length, while the irradiating direction of the front lamps 211 is directed forward in the vehicle length.

A supporting wall 214 is provided on an upper face of the lamp base 212 so as to protrude upward from a substantially middle position in the length direction of the lamp base 212. A pair of the rear lamps 210 is provided on a rear face of the supporting wall 214 so as to be arranged along the vertical direction. An inclining plate 230 is attached onto a top portion of the supporting wall 214 so as to incline upward and rearward in the vehicle length. The inclining plate 230 and the supporting wall 214 form a separation wall which divides the inside of the lamp cover 213 into a front space and a rear space. Reflective faces are formed on the rear faces in the vehicle length of the supporting wall 214 and the inclining plate 230.

Figure 12:
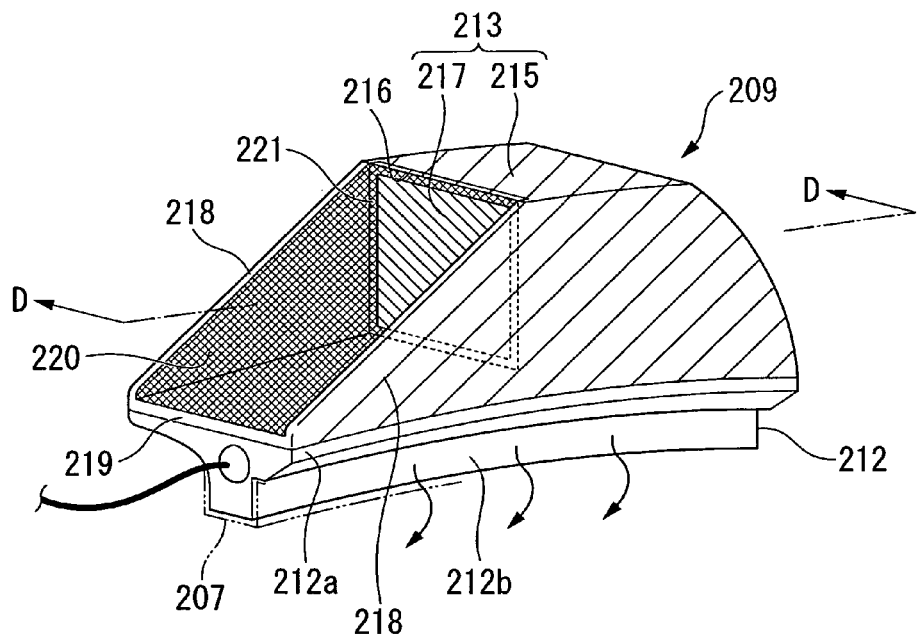
FIG. 12 shows a perspective view of the lamp portion, distinguishing different color portions by different hatchings.

A pair of the front lamps 211 is provided on an upper face of the supporting wall 214 at a position on the forwarder side than the supporting wall 214 so as to be arranged along the vehicle length. As shown in FIG. 12, the lamp base 212 includes: a plate-shaped base portion 212a to be mounted inside an opening edge of the roof-molding attaching groove 207; and a protruding portion 212b which protrudes downward from a lower face of the plate-shaped base portion 212a at a substantially middle position in the width direction of the plate-shaped base portion 212a so as to extend in the vehicle length. The protruding portion 212b works as a heat dissipating portion which radiates heat emitted from the rear lamps 210 and the front lamps 211 to the downward of the lamp base 212. The protruding portion 212b is inserted into the roof-molding attaching groove 207, and radiates heat which is emitted from the rear lamps 210 and the front lamps 211 to the inside of the roof-molding attaching groove 207, to a roof panel.

The lamp cover 213 is made from transparent resin material, and covers both sides of the rear lamps 210 and the front lamps 211 from the upside of these. The lamp cover 213 includes: a cover base body 215 which curves in a solid manner toward a front end thereof; and a rear cover 217 which is fixed into a square-shaped opening 216 formed on the rear end of the cover base body 215. Pair of limiting walls 218 and a bottom wall 219 each extending rearward in the vehicle length are provided on both sides and a lower end side of the opening 216 of the cover base body 215. The bottom wall 219 is formed in a square shape, while the limiting walls 218 are each formed in a substantially triangular shape in which top ends thereof incline downward and rearward in the vehicle length.

The cover base body 215 is colored in amber, while the rear cover 217 is colored in red. As shown in FIG. 12, colored films 220 colored in a black-kind color is provided as a reflection-preventing member, on the insides of the bottom wall 219 and the limiting walls 218 (i.e., on the sides facing the rear cover 217) of the cover base body 215. A shading frame 221 (a shading portion) formed from line-shaped film colored in a black-kind color as same as the colored film 220 of the limiting wall 218 is provided on the rear side in the vehicle length of the rear cover 217, along four lines of the rear cover 217.

In this lamp 209, as mentioned in the above, the inside of the lamp cover 213 is divided into the front space and the rear space by the supporting wall 214 and the inclining plate 230. The light emitted from the front lamps 211 irradiates the forward, the sides, and the upward through the cover base body 215, while the light emitted from the rear lamps 210 irradiates the rearward through the rear cover 217. In the present embodiment, the rear lamps 210 and the rear cover 217 form a rear illuminating portion of the present invention, while the front lamps 211 and the cover base body 215 form another illuminating portion of the present invention.

As shown in FIG. 13, a shading plate 222 formed from nontransparent metal or nontransparent resin is provided at a connection between the cover base body 215 and the rear cover 217 so as to be sandwiched therebetween. This shading plate 222 may be unitarily formed with the inclining plate 230 as shown in FIG. 13; however, it can be a separate member. Since the cover base body 215 and the rear cover 217 are formed from transparent material, the lights emitted from the front lamps 211 and the rear lamps 210 are transmitted to the neighboring members through the inside of the cover base body 215 and the rear cover 217. On the other hand, since the shading plate 222 is sandwiched at a connection between the cover base body 215 and the rear cover 217, transmission of the light between the cover base body 215 and the rear cover 217 is interrupted by the shading plate 222. Accordingly, in this lamp 209, it is possible to effectively reduce the deterioration in a contrast and the change in a tone, which would occur if transmission of the light between the cover base body 215 and the rear cover 217 is occurred and the light from the front lamps 211 and the light from rear lamps 210 are mixed with each other. Moreover, in the present embodiment, the shading plate 222 forms a light-transmission interrupting portion of the present invention.

As has been explained in the above, in the lamp 209 of the present embodiment, the irradiating directions in the lamp cover 213 between lights emitted from the front lamps 211 and lights emitted from the rear lamps 210 are separated by the supporting wall 214 and the inclining plate 230. Furthermore, light from the front lamps 211 and the light from the around of the vehicle are prevented from entering into the lamp 209 though the sides thereof and therearound, by the limiting walls 218 provided on the rear end of the cover base body 215 so as to extend therefrom. Thus, it is possible to clearly distinguish between the light around the lamp 209, and the light emitted from the rear lamps 210 and irradiates the rearward in the vehicle length through the rear cover 217. Therefore, the visibility from the rearward in the vehicle length can be improved reliably. Especially, in the present embodiment, the colored films 220 colored in a black-kind color is provided on the insides of the bottom wall 219 and the limiting walls 218 of the cover base body 215; and furthermore, the shading frame 221 colored in a black-kind color is provided on the periphery of the rear cover 217. Accordingly, since the contrast of the illuminating portion in the rear cover 217 increases, the visibility from the rearward in the vehicle length becomes further preferable. Furthermore, in the present embodiment, the rear lamps 210 formed from an LED having the high directivity is provided so as to direct the rearward in the vehicle length. This construction is also effective for improving the visibility of the lamp 209 from the rearward in the vehicle length.

In addition, in the lamp 209 of the present embodiment, leakage of the red light toward the sides in the vehicle direction through the rear cover 217 is prevented by the limiting walls 218; therefore, it is possible to reliably suppress the confusing effect to the around of the present vehicle caused by the leaking red light.

In addition, in the lamp-mounted vehicle 201 of the present invention, the lamps 209 are attached onto the front end portion of the roof 204; therefore, as shown in FIG. 9, if the heavy-duty truck 203 approaches the lamp-mounted vehicle 201 having the lamps 209 turned on, from the behind to reach within the predetermined distance 200L, the illuminating lamps 209 on the front end portion of the roof 204 will reliably appear on a line of sight 200i of the driver in the heavy-duty truck 203; therefore, it is possible to attract an attention of the driver in the following heavy-duty truck 203 to recognize the existence of the lamp-mounted vehicle 201.

Especially, in the lamp 209 of the present embodiment, the top ends of the limiting walls 218 incline downward and rearward in the vehicle length; therefore, the limiting walls 218 will not be an obstacle in the lower field of view of the driver in the heavy-duty truck 203 approaching the lamp-mounted vehicle 201, for viewing the rear cover 217. This function is also effective for improving the visibility of the lamp 209.

Furthermore, in the lamp-mounted vehicle 201 of the present embodiment, since the lamps 209 are attached onto the front end portion of the roof 204, the illuminating lamps 209 arranged at the high position can be recognized preferably by the vehicles and the pedestrians in the forward and the sides of the lamp-mounted vehicle 201.

Accordingly, in the case in which this lamp 209 is employed, it is possible to effectively attract attentions for making recognize the present vehicle in many directions around the present vehicle by the lightening lamp 209, without largely increasing the number of lamps to be mounted.

A Third Embodiment

Figure 14:
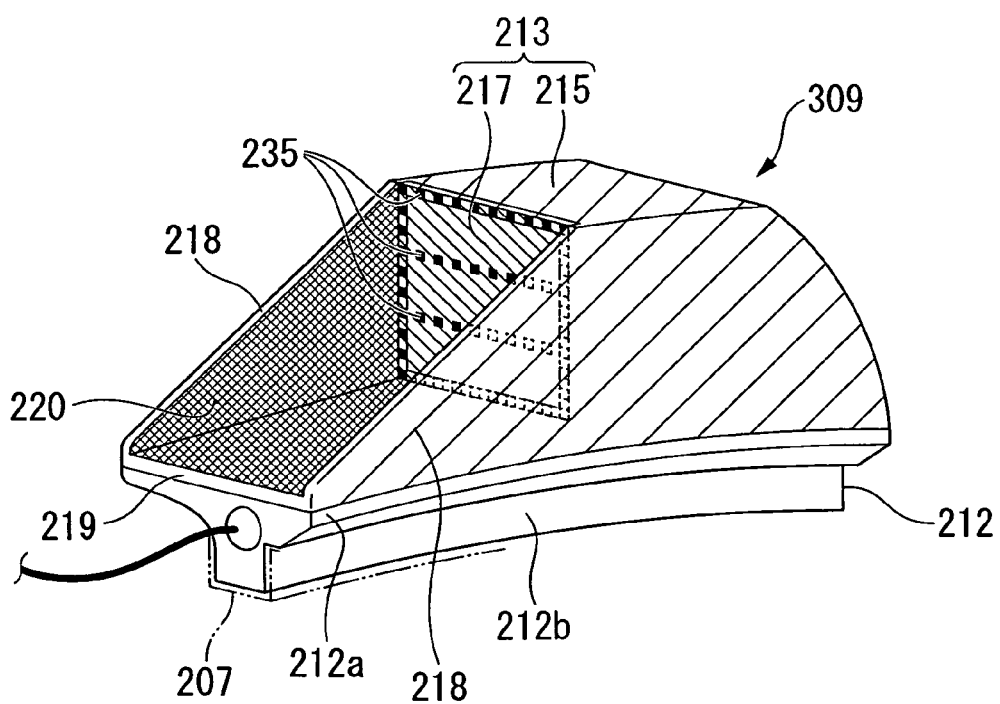
FIG. 14 shows a perspective view of a lamp-mounted vehicle according to a third embodiment of the present invention, distinguishing different color portions by different hatchings.

FIG. 14 shows a third embodiment of the present invention.

Construction of a lamp 309 of the present embodiment is basically the same as that of the lamp 209 of the second embodiment; however, the lamp 309 differs from the lamp 209 in the point in that shading portions 235 formed by a colored film colored in black-kind color are formed in a dotted-line manner on the rear cover 217 at the periphery and the middle positions thereof.

In the lamp 309 of the present embodiment, in addition to the advantageous effects of the above-mentioned second embodiment, it is possible to irradiate illumination light having the higher contrast in the brightness to the rearward in the vehicle length, and furthermore, it is also possible to improve the design performance of the illumination face.

In the above-mentioned second embodiment and third embodiment, intensities, illuminating patterns, or the like of lights emitted from the front lamps 211 and the rear lamps 210 may differ from each other. For example, in the above embodiments, each of the front lamps 211 and the rear lamps 210 illuminates continuously; however, it may be arranged such that the front lamps 211 illuminates continuously while the rear lamps 210 illuminate blinkingly.

Like this, in the case in which colors, intensities, illuminating patterns, or the like of lights emitted from the front lamps 211 and the rear lamps 210 differ from each other, it is possible to provide to the single lamp 209 with different functions or the different visual effects between: the views from the forward side and the side of the lamp 269; and the view from the rearward side of the lamp 209. Accordingly, in this case, it is possible to reduce the number of parts and to improve the design performance of the lamp 209, comparing to arranging a plurality kinds of lamps each having single function.

Moreover, the present invention will not be limited only to the above-mentioned second embodiment and third embodiment. Additions, omissions, substitutions, and other modifications can be made without departing from the spirit or scope of the present invention. For example, in the second embodiment and the third embodiment, the lamps 209 and 309 are mounted in the roof-molding attaching grooves 207; however, the lamps 209 and 309 may be mounted on the locations other than roof-molding attaching grooves 207 within the front end portion of the roof 204.

In addition, in the above-mentioned second embodiment and third embodiment, the front lamps 211 direct the upward while the rear lamps 210 direct the rearward; however, it may be arranged such that the front lamps 211 direct the forward while the rear lamps 210 direct the upward.

Furthermore, in the above-mentioned second embodiment and third embodiment, when the lamp 209 is seen from the rearward, the limiting walls 21.8 and the bottom wall 219 form a concave portion; however, it may be arranged such that a transparent covering wall extending from the top face of the cover base body 215 so as to reach the both limiting walls 218 is provided in order to cover a space surrounded by the limiting walls 218 and the bottom wall 219.

The present invention explained in the above can be summarized below.

The present invention provides a lamp for a vehicle (the lamp 209) mounted on a forward top end of a vehicle roof (the roof 204), including: a rear illuminating portion (the rear lamps 210 and the rear cover 217) which irradiates the rearward of a present vehicle; another illuminating portion (the front lamps 211 and the cover base body 215) which irradiates directions other than the rearward; a separation wall (the supporting wall 214 and the inclining plate 230) which divides between the rear illuminating portion and the another illuminating portion; and limiting walls (the limiting walls 218) which extend rearward in the vehicle length at least from both sides in the width of the rear illuminating portion, and limit an irradiating region of the rear illuminating portion.

According to the lamp for a vehicle, the light emitted from the another illuminating portion is visible from the forward and the sides of the present vehicle, while the light emitted from the rear illuminating portion is visible from the rearward of the present vehicle. The light emitted from the rear illuminating portion is separated from the light emitted from the another illuminating portion, by the separation wall. In addition, the limiting walls extending rearward from the both sides in the vehicle width will inhibit light coming into a rear illuminating portion from therearound, and also inhibit light leaking from the rear illuminating portion to the sides of the present vehicle.

Accordingly, since the lamp is arranged at the front top end portion of the vehicle roof, light emitted from the another illuminating portion is visible from the forward and the sides of the present vehicle. In addition, light emitted from the rear illuminating portion is preferably visible from a driver in a driver's seat of a following high-view point vehicle such as a heavy-duty truck. Accordingly, it is possible to enhance attracting attentions around the present vehicle by the lightening lamp, without largely increasing the number of parts.

Furthermore, in the present embodiment, the separation wall can separate light emitted from the rear illuminating portion, from light emitted from the another illuminating portion; and furthermore, the separation wall can inhibit light coming into the rear illuminating portion from the sides of the present vehicle, and can inhibit light leaking from the rear illuminating portion to the sides of the present vehicle. Accordingly, the visibility from the rearward of the present vehicle can be increased by distinguishing light emitted from the rear illuminating portion, from light around the present vehicle. In addition, it is possible to suppress the confusing effect caused by light leaking from the rear illuminating portion to the sides of the present vehicle.

In the lamp for a vehicle according to the above (8), a reflection-suppressing member (the colored film 220) is provided on faces of the limiting walls, facing the rear illuminating portion.

According to the lamp for a vehicle, reflection on the faces of the limiting walls, facing the rear illuminating portion can be suppressed by the reflection-suppressing member; therefore, light emitted from the rear illuminating portion can be distinguished reliably from light therearound.

Accordingly, since reflections on the faces of the limiting walls, facing the rear illuminating portion are suppressed by the reflection-suppressing member, light emitted from the rear illuminating portion can be distinguished clearly from therearound, and therefore the visibility from the rearward of the present vehicle can be further increased.

In the lamp for a vehicle according to the above (8) or (9), a shading portion (the shading frame 221 and the shading portion 235) which partially shades a part of the illuminating region on the rearward in the vehicle length is provided to the rear illuminating portion.

According to the lamp for a vehicle, it is possible to add partial contrast in the brightness to light emitted from the rear illuminating portion by the shading portion partially arranged on the rear illuminating portion. Furthermore, by arranging the shading portion so as to form a specific pattern, the design performance of the lightening rear illuminating portion can be improved.

Accordingly, with the shading portion partially arranged onto the rear illuminating portion, the rearward of the present vehicle can be irradiated by illumination light having contrast in the brightness; therefore, it is possible to further increase the visibility of the lamp for a vehicle from the rearward of the present vehicle, and to improve the design performance of the rear illuminating portion.

The lamp for a vehicle according to one of the above (8) to (10), including a transparent cover (the lamp cover 213) provided to the around of the rear illuminating portion and the another illuminating portion, further includes a light-transmission interrupting portion (the shading plate 222) which interrupts light passing through the transparent cover between the rear illuminating portion and the another illuminating portion.

In this case, since light is prevented from passing through the transparent cover by the light-transmission interrupting portion, it is possible to prevent light leaking through the transparent cover between the rear illuminating portion and the another illuminating portion.

Accordingly, since light passing through the transparent cover can be interrupted by the light-transmission interrupting portion, it is possible to reduce the deterioration in a contrast and the change in a tone, which would occur if transmission of the light between the rear illuminating portion and the another illuminating portion is occurred, and thereby enabling further improvement in the visibility.

In the lamp for a vehicle according to one of the above (8) to (11), light emitted from the rear illuminating portion and light emitted from the another illuminating portion differ from each other.

Specifically, for example, it may be arranged such that the rear illuminating portion emits blinking red light while the another illuminating portion emits white or amber light. In this case, it is possible to realize different functions and the visual effects between the view from the forward and the side, and the view from the rearward of the present vehicle.

EXPLANATIONS FOR THE REFERENCE SYMBOLS

204 . . . a roof; 209 and 309 . . . a lamp (a lamp for a vehicle); 210 . . . a rear lamp (a rear illuminating portion); 211 . . . a front lamp (another illuminating portion); 213 . . . a lamp cover (a transparent cover); 214 . . . a supporting wall (a separation wall); 215 . . . a cover base body (another illuminating portion); 217 . . . a rear cover (a rear illuminating portion); 218 . . . a limiting wall; 220 . . . a colored film (a reflection-suppressing member); 221 . . . a shading frame (a shading portion); 222 . . . a shading plate (a light-transmission interrupting portion); 230 . . . an inclining plate (a separation wall); 235 . . . a shading portion.

A Fourth Embodiment

A fourth embodiment of the present invention will be explained below with reference to FIGS. 15 to 22. Moreover, an arrow FW in the drawings indicates the forward in the vehicle direction.

Figure 15:
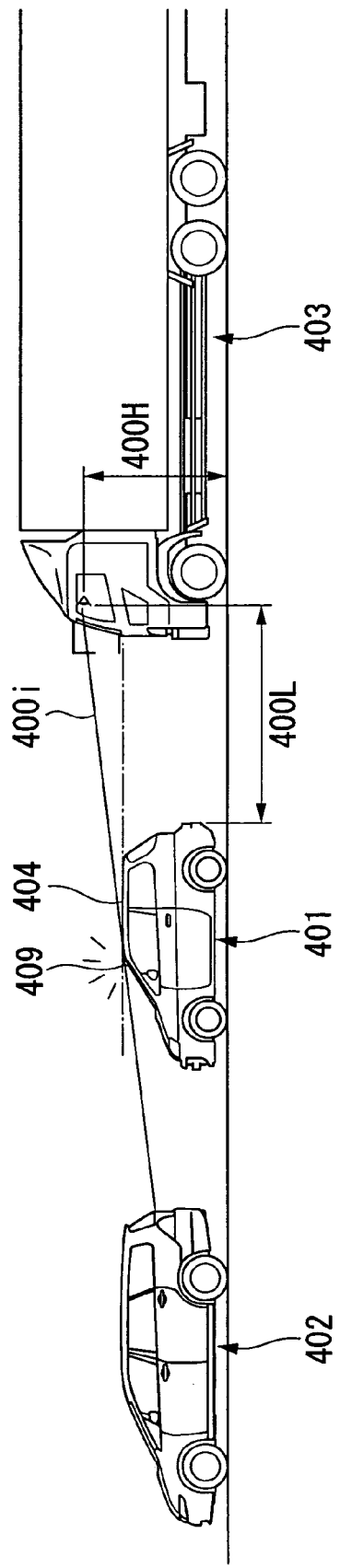
FIG. 15 shows a side view of a lamp-mounted vehicle according to a fourth embodiment of the present invention.

FIG. 15 shows a vehicle 401 equipped with a lamp for a vehicle 409 (hereinafter "lamp 409") according to the present embodiment, wherein the vehicle 401 is running on a road while being sandwiched between a preceding standard vehicle 402 and a following heavy-duty truck 403. The reference symbol "400*i*" in FIG. 15 denotes a line of sight of a driver in the heavy-duty truck 403 when the further preceding standard vehicle 402 comes into a front field of view of the driver in the heavy-duty truck 403, over a roof 404 of the preceding vehicle 401. A driver's seat of the heavy-duty truck 403 is sufficiently higher than that of the standard vehicle 402; therefore, the height 400H of the line of sight of the driver in the driver's seat is also higher.

Figure 16:
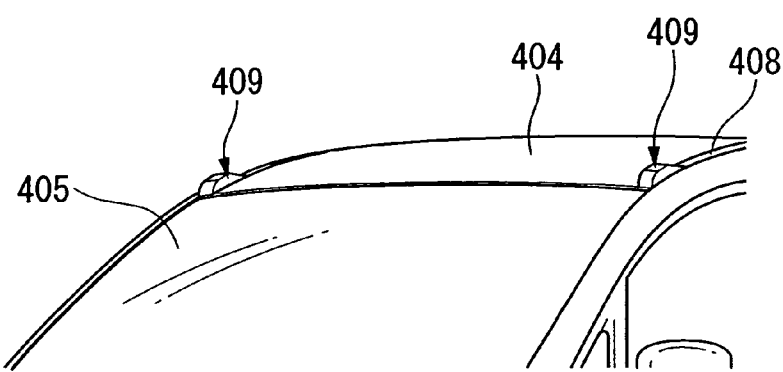
FIG. 16 shows a perspective view of the lamp-mounted vehicle seen from the forward and the upward.
Figure 17:
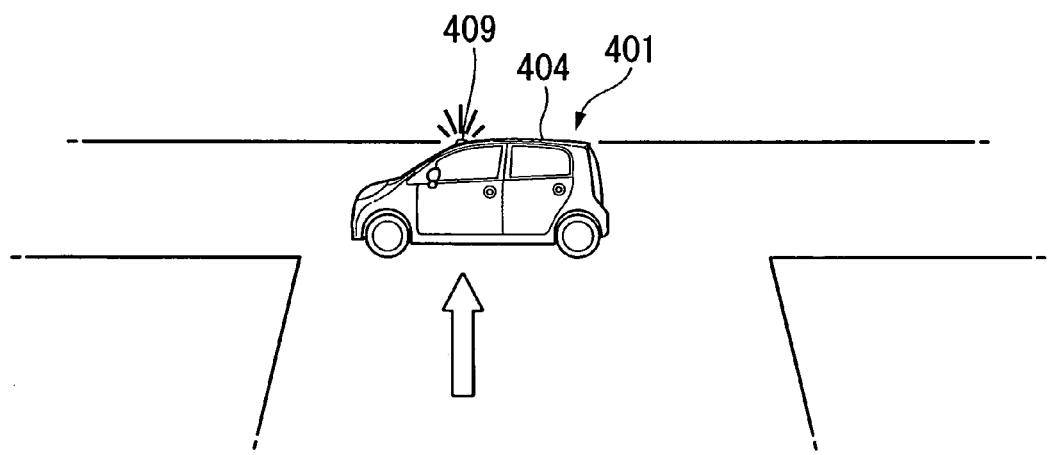
FIG. 17 shows a bird's-eye view showing the way to use the lamp for a vehicle.

The roof 404 of the vehicle 401 protrudes upward at most at a substantially center position thereof in the vehicle length direction, and this most protruding portion forms a top portion of the roof 404. As shown in FIG. 16, a forwarder side than the top portion of the roof 404 inclines forwardly and downwardly in the vehicle length direction to a window glass 405.

Roof-molding attaching grooves (not illustrated) are formed along the vehicle length direction at both sides in the vehicle width direction of the roof 404. A lamp 409 is attached together with a resin-made roof molding 408 into each of the roof-molding attaching grooves. The lamp 409 is arranged at a front end portion of the roof-molding attaching groove such that a portion thereof protrudes upward at the front end portion of the roof 404. Moreover, in the present embodiment, the lamp 409 of the present embodiment works as a sidelight which can be illuminated upon an operation of a switch by a driver in the driver's seat.

Figure 18:
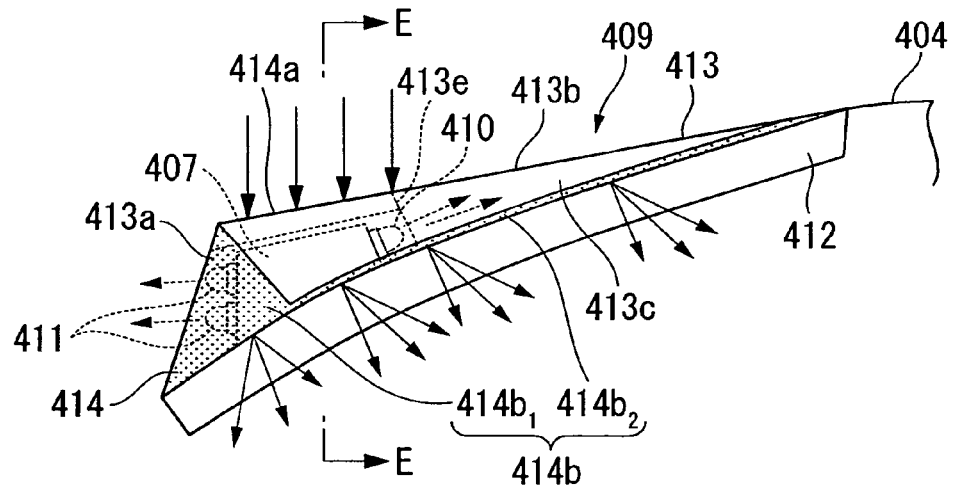
FIG. 18 shows a side view of the lamp for a vehicle.

As shown in FIG. 18, the lamp 409 is provided with: a rear lamp 410 (a light source) for irradiating the rearward of the present vehicle; front lamps 411 (a light source) for mainly irradiating the forward of the present vehicle; a lamp-supporting member 407 which supports the rear lamp 410, the front lamps 411, and a circuit member (not illustrated) for illuminating these; a lamp base 412 on which the lamp-supporting member 407 is supported at a top center position thereof, and which is mounted into the roof-molding attaching groove; and a lamp housing 413 which is attached onto the lamp base 412 to cover the above and therearound of the lamp base 412.

Figure 19:
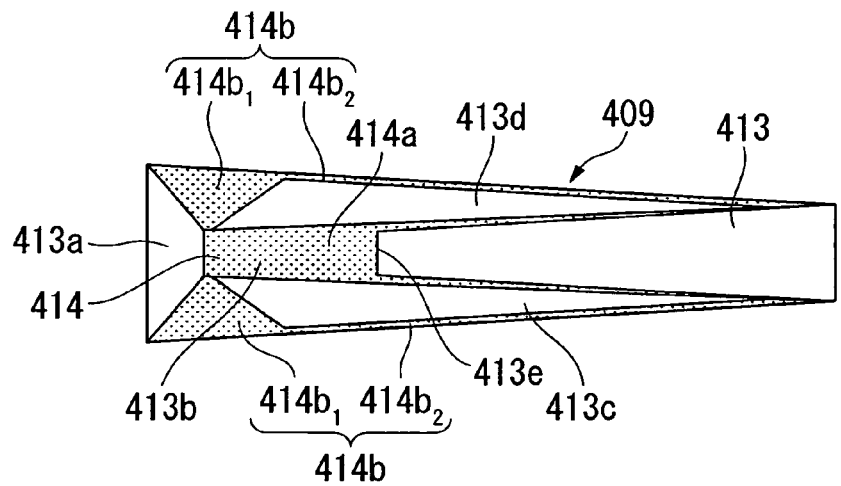
FIG. 19 shows a plan view of the lamp for a vehicle.
Figure 20:
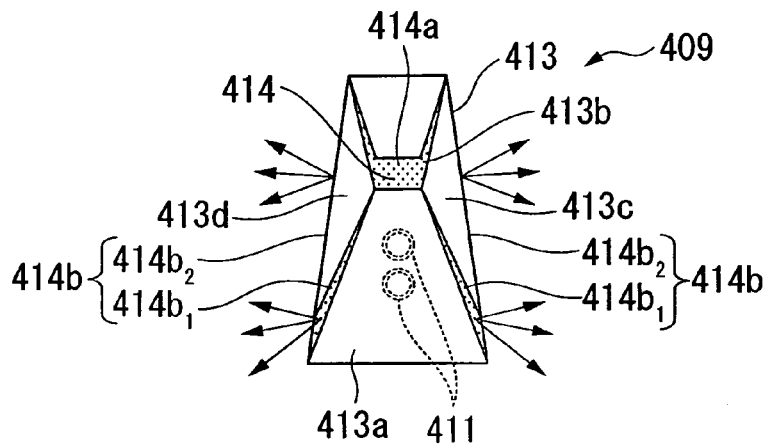
FIG. 20 shows a front view of the lamp for a vehicle.

As shown in FIGS. 18 to 20, the lamp housing 413 is provided with: a substantially trapezoidal front wall 413*a* which faces the forward in the vehicle length; a top wall 413*b* which is continuous with a short upper line of the front wall 413*a*, and formed in a long trapezoidal shape extending along the length direction of the lamp housing 413; substantially triangular-shaped side walls 413*c* and 413*d* which are continuous with the both sides of the top wall 413*b*. The top wall 413*b* is formed in a U-shape so as to form an illumination passage for the rear lamp 410. The lamp housing 413 further includes a rear cover wall 413*e* which is continuous with a removed portion of the tip wall 413*b* and covers the forward irradiating direction of the rear lamp 410. The front wall 413*a*, the rear cover wall 413*e*, and a part of the side walls 413*c* and 413*d* are formed by colored transparent resin material having the substantially constant thickness. Remaining portions of the top wall 413*b* and the side walls 413*c* and 413*d* are formed by a light-guiding member 414 made from high light-transferring performance material such as resin, glass, or the like.

Figure 21:
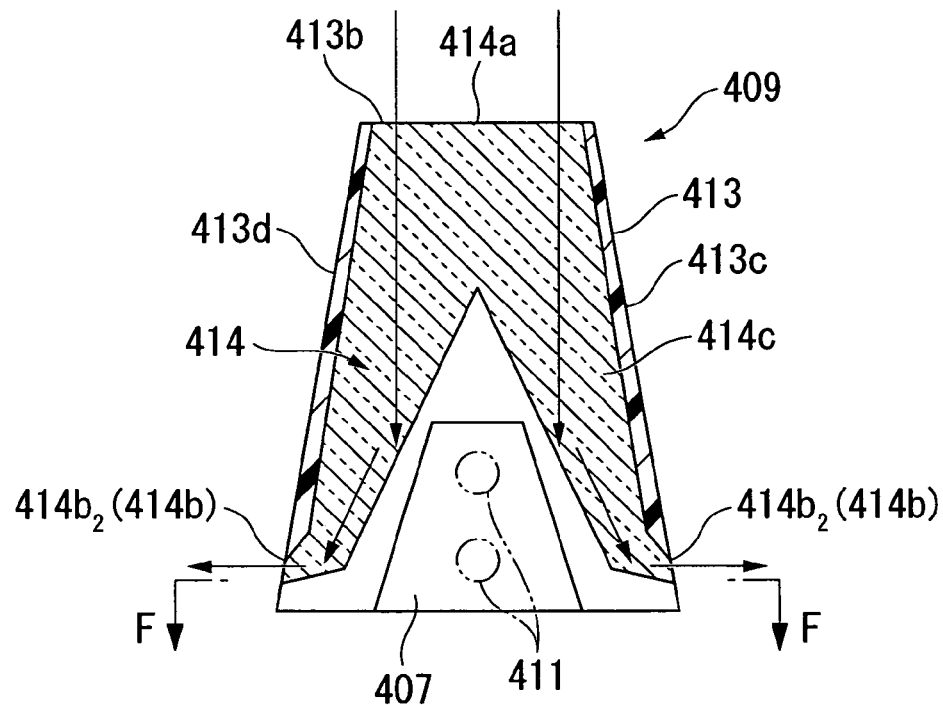
FIG. 21 shows a cross-sectional view of the lamp portion, taking along the line E-E of FIG. 18.

In FIGS. 18 to 20, dotted portions indicate light-guiding members 414 which are exposed to the exterior of the lamp housing 413. This light-guiding member 414 includes: an external light entering portion 414*a* being the top wall 413*b* forming a long trapezoidal shape along the length direction of the lamp housing 413; and external light emitting portions 414*b* being portions of the both side walls 413*c* and 413*d*. As shown in FIG. 21, these external light entering portion 414*a* and external light emitting portions 414*b* communicate with each other in a block (i.e., in the lamp housing 413).

Figure 22:
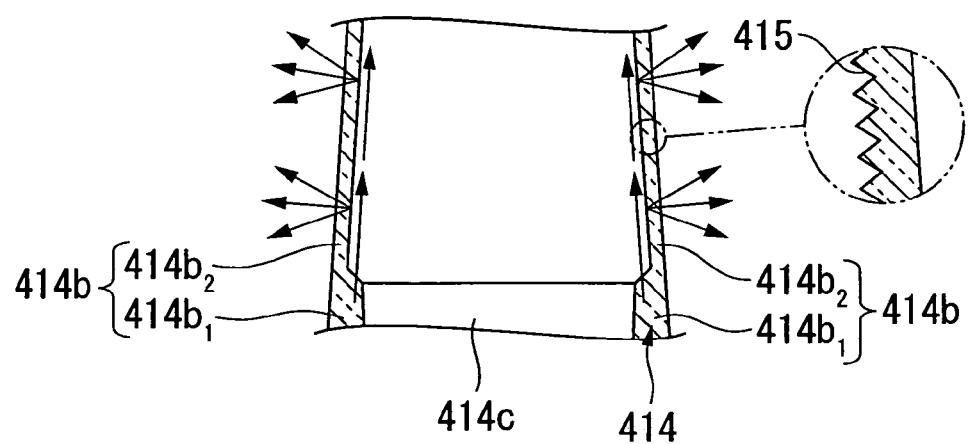
FIG. 22 shows a cross-sectional view of the lamp portion, taking along the line F-F of FIG. 21.

Further explanation will be made below for the external light emitting portions 414*b*. Each of the external light emitting portions 414*b* includes: a substantially triangular-shaped front region 414$b_1$ arranged at forward portions of the side wall 413*c* or 413*d*; and a low edge region 414$b_2$ extending from the bottom of the front region 414$b_1$ to the rearward in the vehicle length to form a band shape. As indicated by arrows in FIG. 21, light entering from the external light entering portion 414*a* and guided downward to the lower portion of the block inside the light-guiding member 414 passes through the front regions 414$b_1$ and the low edge regions 414$b_2$, and then irradiates the outside in the width direction of the lamp 409. Moreover, as shown in FIG. 22, a plurality of concaves and convexes 415 is formed on an inner face of the low edge region 414$b_2$. As indicated by arrows in FIG. 22, light guided by the low edge region 414$b_2$ is diffused by the concaves and convexes 415, and thereby irradiates wide regions in the vehicle length direction.

As has been explained in the above, according to the vehicle 401 of the present embodiment, since each of the lamps 409 is arranged at the left and the right on the front top face of the roof 404, the lightening lamps 409 are visible from the sides and the rearward of the vehicle 401, but not only from the forward of the vehicle 401.

Especially, as shown in FIG. 15, if the heavy-duty truck 403 approaches the vehicle 401 having the lamps 409 turned on, from the behind to reach within the predetermined distance 400L, the illuminating lamps 409 on the front end portion of the roof 404 will reliably appear on a line of sight 400*i* of the driver in the heavy-duty truck 403; therefore, it is possible to attract an attention of the driver in the following heavy-duty truck 403 to recognize the existence of the vehicle 401.

Accordingly, in the case in which the lamp 409 of the present embodiment is employed, it is possible to effectively attract attentions for making recognize the vehicle 401 in many directions around the vehicle 401 by the lightening lamp 409, without largely increasing the number of lamps to be mounted.

In addition, the lamp 409 includes the light-guiding member 414 which guides external light entering from the top wall 413*b* of the lamp housing 413 to the external light emitting portions 414*b* of the side walls 413*c* and 413*d* of the lamp housing 413; therefore, it is possible to effectively irradiate the sides of the vehicle 401 using sunlight or light from street lamps which enters from the above of the vehicle 401. Accordingly, by using the light together with the light emitted from the lamps 410 and 411, it is possible to irradiate the around of the vehicle 401 more brightly. Otherwise, if the light amount of the external light is enough for the illumination, it is possible to reduce the light amount of the lamps 410 and 411, or to turn off the lamps 410 and 411.

Accordingly, if the lamps 409 are employed, since these lamps 409 are mounted on the front end portion of the roof 404, it is possible to attract high attentions of the drivers in vehicles and the pedestrians around the vehicle 401, while suppressing the increase in power consumption.

In addition, in the lamps 409, even when the lamps 410 and 411 are turned off, since the lamps 409 can illuminate the external light toward the around of the vehicle 401, it is possible to attract attentions around the vehicle 401, while in a parking state.

In addition, in the lamp 409 of the present invention, since the external light emitting portion 414*b* of the light-guiding member 414 is provided so as to direct the sides of the vehicle 401, it is possible to supply the sufficient light amount to irradiate the sides of the vehicle 401 where is difficult for the light to reach. Especially, at the crossing or the like, at the dusk or the night, it is possible to effectively collect lights from the street lamps and the like, and to cancel the confusing effect which is caused by the insufficient light amount of the lamps 409.

Figure 23:
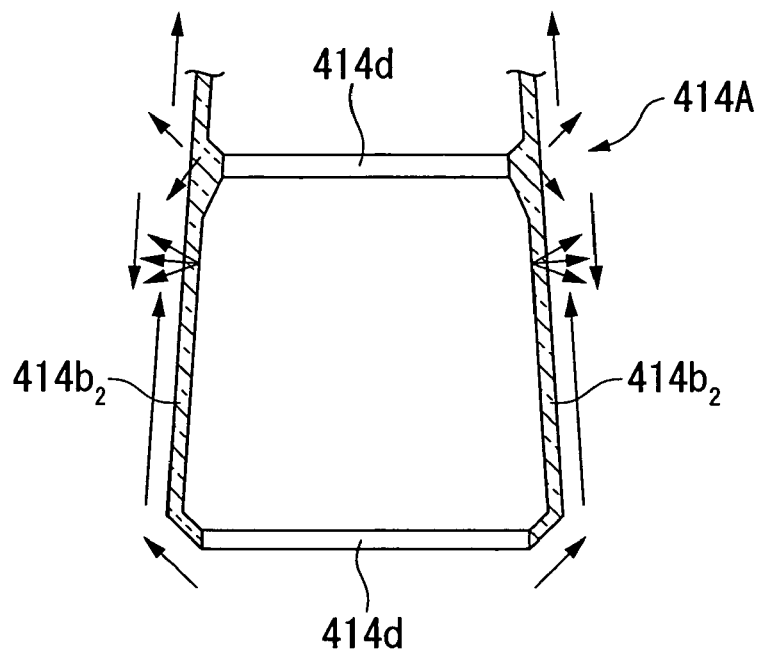
FIG. 23 shows a cross-sectional view of a variant example of the lamp for a vehicle, seen from the same view point as of FIG. 22.

Moreover, in the above-embodiment, the light-guiding member is employed in which a light-guiding member 414*c* (refer to FIGS. 21 and 22) that guides the input light from the upward to the downward is formed by a thick block; however, as shown in FIG. 23, a light-guiding member 414A may be employed instead of it which is formed by arranging in the vehicle length direction a plurality of thin plate-shaped light-guiding members 414*d* in a parallel manner with each other. In this case, since the thickness of the light-guiding member 414A (i.e., the thickness of the each light-guiding members 414*d*) becomes substantially constant along the vertical direction, if the light-guiding member 414A is made by resin especially, the shrinkage and the like will hardly occur.

A Fifth Embodiment

Figure 24:
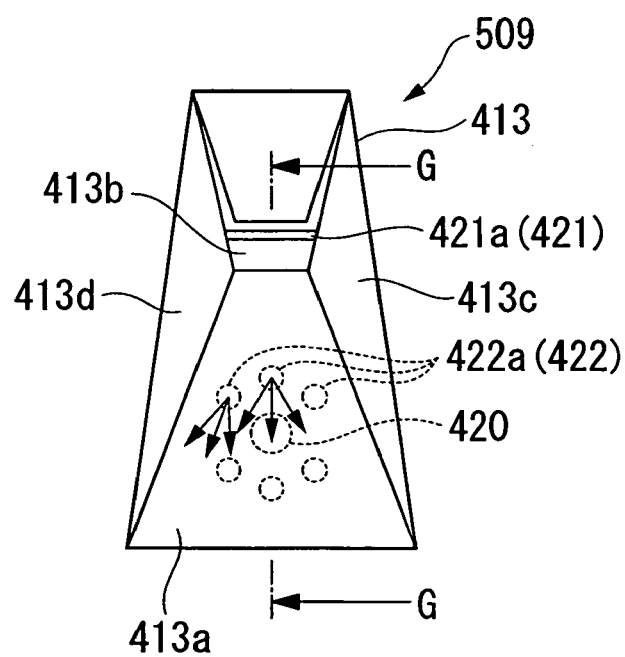
FIG. 24 shows a front view of a lamp for a vehicle according to a fifth embodiment of the present invention.
Figure 25:
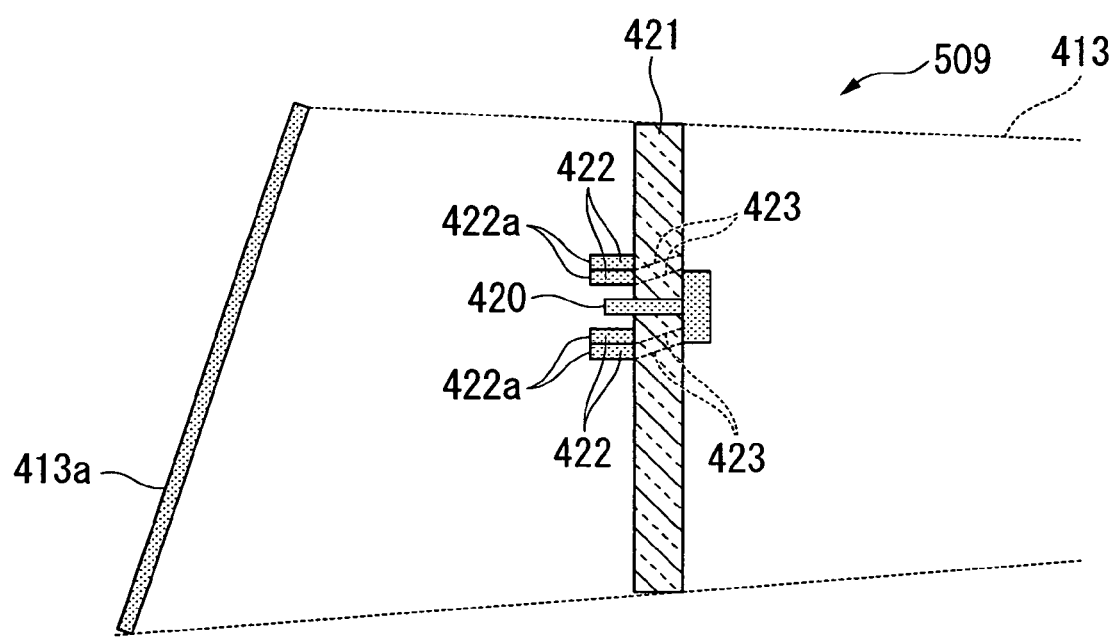
FIG. 25 shows a cross-sectional view of the lamp portion, taking along the line G-G of FIG. 24.

FIGS. 24 and 25 show a fifth embodiment of the present invention. Moreover, in the following explanations of each embodiment, the same reference symbols will be applied to the same components as those of the above-mentioned fourth embodiment, and explanations therefor will be omitted here. In addition, a lamp of the present embodiment is mounted on a front top portion of a roof of a vehicle as same as that of the fourth embodiment.

In a lamp 509 of the present embodiment, an LED 420 (a light source) for irradiating forward is supported by a light-guiding plate 421 formed by a light-guiding member, and a plurality of rod-shaped protrusions 422 formed by a light-guiding member is arranged on a front face of the light-guiding plate 421 at the around of the LED 420. The light-guiding plate 421 is arranged such that a top end face thereof is exposed from an upper face of the lamp housing 413; and the top end face of the light-guiding plate 421 forms an external light entering portion 421a. The side faces of the light-guiding plate 421 may be exposed to the exterior of the lamp housing 413. In addition, light-guiding faces 423 each inclines upward from bottom portions of the rod-shaped protrusions 422 are provided in the light-guiding plate 421. These light-guiding faces 423 are portions where the refractive indexes are changed, and are arranged so as to guide external light entering from the upward toward distal ends of the each rod-shaped protrusions 422. In the present embodiment, each of the distal ends of the rod-shaped protrusions forms an external light emitting portion 422a.

In this lamp 509, the external light entering from the external light entering portion 421a is guided through the light-guiding plate 421 to the rod-shaped protrusions 422 arranged around the LED 420, and is then emitted from the distal ends of the rod-shaped protrusions 422 to the forward. Accordingly, in the present embodiment, the illuminating direction of the external light guided though the light-guiding plate 421 and the rod-shaped protrusions 422 is the forward in the vehicle length as same as the illuminating direction of the LED 420; therefore, it is possible to attract higher attention in the forward of the vehicle. Moreover, in the above, an explanation is made for a light illuminating construction which irradiates the forward of the vehicle; however, another construction which irradiates the rearward may be employed by utilizing the same construction.

In addition, in this lamp 509, since the illuminating direction of the external light through the light-guiding plate 421 and the rod-shaped protrusions 422 is the same as the illuminating direction of the LED 420, it is possible to decrease or turn off the light emitted from the LED 420 under the condition in which sufficient external light is available. In this case, power consumption of the vehicle can be suppressed.

A Sixth Embodiment

Figure 26:
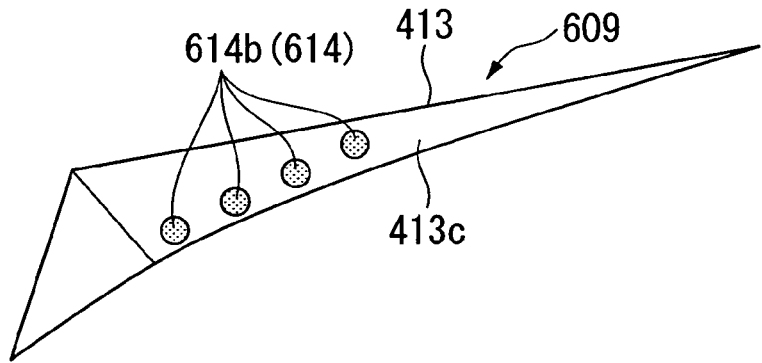
FIG. 26 shows a side view of a lamp for a vehicle according to a sixth embodiment of the present invention.

FIG. 26 shows a sixth embodiment of the present invention.

Basic constructions of a lamp 609 of the present embodiment are substantially the same as those of the above-mentioned fourth embodiment. The lamp 609 of the present embodiment differs from that of the fourth embodiment in the point that it includes external light emitting portions 614b of a light-guiding member 614 which is arranged on the side wall 413c of the lamp housing 413. That is, each of the external light emitting portions 614b of the present embodiment has a circular shape, and is provided in plural. The plurality of external light emitting portions 614b are arranged along the length direction of the side wall 413c of the housing 413 with a constant gap therebetween.

In this lamp 609, since the plurality of external light emitting portions 614b are distributed so as to face the exterior of the vehicle, the higher attention-attracting effect can be obtained, comparing to the case of employing a continuous and monotony external light emitting portion. Furthermore, the design performance of the entire of the lamp 609 can be increased.

Figure 27:
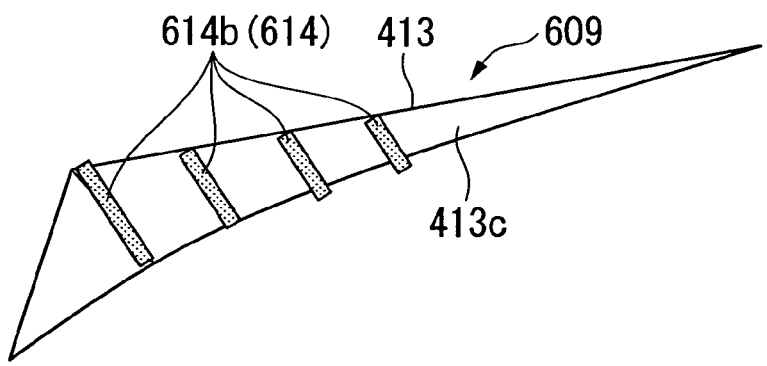
FIG. 27 shows a side view of the lamp for a vehicle.

Moreover, each of the external light emitting portions 614b is formed in a circular shape in the embodiment shown in FIG. 26; however, for example as shown in FIG. 27, each of the external light emitting portions 614b may be formed in a plate shape extending in the vertical direction and having different vertical lengths with each other.

In addition, in the above-mentioned fourth to sixth embodiments, the external light entering portion of the light-guiding member is arranged on the top face of the lamp housing; however, the external light entering portion may be formed on an inner side wall (for example, a side wall 413d indicated in FIGS. 19 and 20) formed on an inside in the vehicle width direction of the lamp housing. In this case, since the inside wall of the lamp housing is hardly seen from the outside of the vehicle, portions of the lamp where are visible from the outside of the vehicle will not be restricted by the external light entering portion; therefore, the design performance of the lamp can be increased. Furthermore, in the case in which the external light entering portion is formed on the side wall 413d on the inside in the vehicle width direction, since reflections of light will be smaller comparing to light entering from the external light entering portion and guided to external light emitting portion, an attenuation of light will be decreased. Therefore, it is effective for illuminating brighter light toward the side of the vehicle.

A Seventh Embodiment

Figure 28:
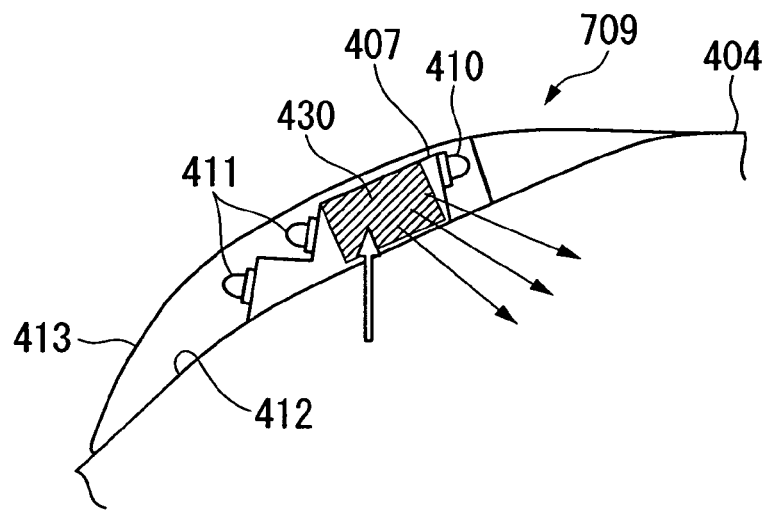
FIG. 28 shows a schematic cross-sectional view of a lamp-mounted vehicle according to a seventh embodiment of the present invention.

FIG. 28 shows a seventh embodiment of the present invention.

In a lamp 709 of the present embodiment, a lamp-supporting member 407 is arranged at a substantially center position of an upper face of the lamp base 412. The front lamps 411 are attached to the front of the lamp-supporting member 407 while the rear lamp 410 is attached to the rear of the lamp-supporting member 407. A mirror 430 being a reflection member is attached onto the outside dace in the vehicle width direction of the lamp-supporting member 407 or the side face of the housing 413. A plurality of concaves and convexes are formed on the outside face of the mirror 430 in order to diffuse the external light.

In the lamp 709 of the present embodiment, since the mirror 430 is provided so as to face the outside in the vehicle width direction, it is possible to reflect and illuminate sunlight, light from the street lamps, light from headlamps of another vehicle, or the like, to the outside of the vehicle in the vehicle width direction. Accordingly, it is possible to illuminate brighter light to the around of the vehicle by utilizing lights emitted from the lamps 410 and 411 together. Or, if the light amount of the external light is sufficient, it is also possible to suppress the light amount of the lamps 410 and 411, or to turn off the lamps 410 and 411.

An Eighth Embodiment

Figure 29:
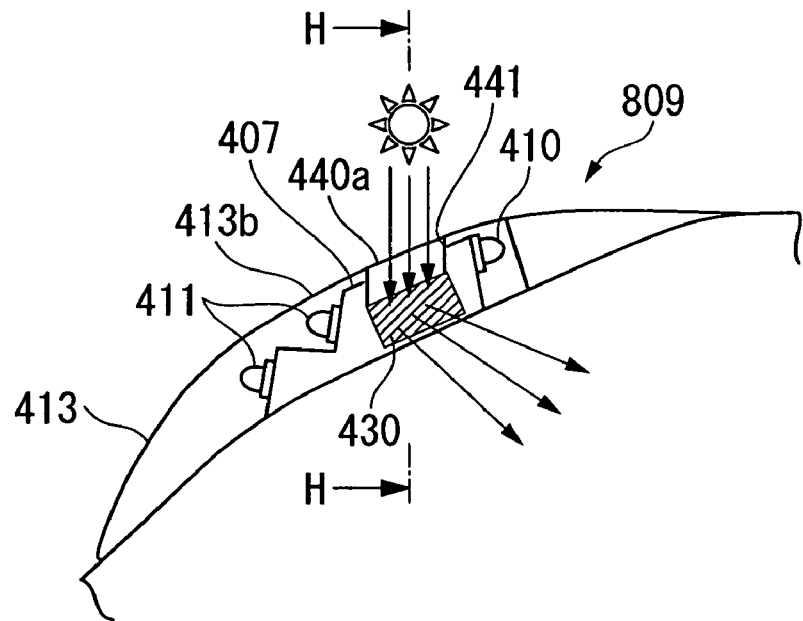
FIG. 29 shows a schematic cross-sectional view of a lamp for a vehicle according to an eighth embodiment of the present invention.
Figure 30:
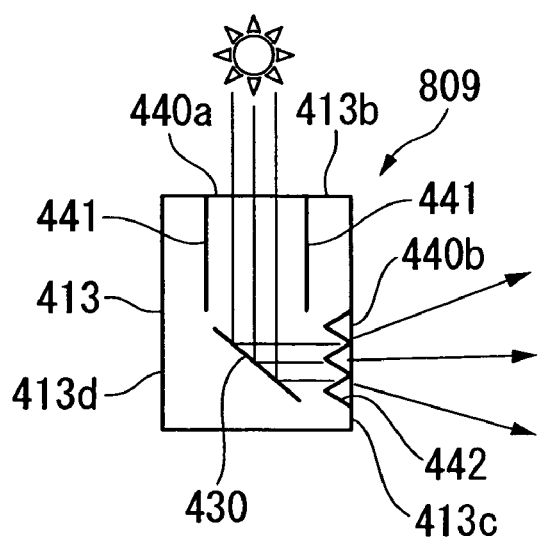
FIG. 30 shows a cross-sectional view of the lamp for a vehicle, taking along the line H-H of FIG. 29.

FIGS. 29 and 30 show an eighth embodiment of the present invention.

A lamp 809 of the present embodiment is provided with a mirror 430 arranged on the lamp-supporting member 407 so as to face upward while inclining to the outside in the vehicle width direction. An external light entering portion 440a made from transparent resin is provided on the top wall 413b of the lamp housing 413, while an external light emitting portion 440b made from transparent resin is provided on the side wall 413c on the outside in the vehicle width direction. Moreover, the inclination angle of the mirror 430 is preferable to be set such that light entering from the upward is reflected toward the slightly downward than the horizontal direction. Guide walls 441 are provided in the lamp housing 414 between the external light entering portion 440a and the mirror 430 so as to surround a light-guiding path. A corrugation 442 for diffusing light and irradiating it to the outside of the vehicle is provided on an inner face of a transparent resin member forming the external light emitting portion 440b.

In the lamp 809 of the present embodiment, since the mirror 430 is arranged so as to be inclined, and since the external light entering portion 440a is provided on the top wall 413b of the lamp housing 413 while the external light emitting portion 440b is provided on the side wall 413c of the lamp housing 413, it is possible to efficiently introduce sunlight, light emitted from street lamps, or the like into the lamp 809 from the upward thereof and irradiate the sides of the vehicle 401. Accordingly, it is possible to irradiate the around of the vehicle with the sufficient light amount only by the reflection light of the external light, or by combining the reflection light of the external light and the lights emitted from the lamps 410 and 411; therefore, the attention-attracting effect toward the around of the vehicle 401 can be increased. In addition, as same as the above-mentioned other embodiments, when sufficient external light is available, reducing the light amount of the lamps or turning off the lamps is possible; therefore, it is highly effective for saving electrical power consumption of the vehicle 401.

In addition, also in the present embodiment, by forming the external light entering portion 440a on the side wall 413d on the inside of the lamp housing 413 in the vehicle width direction, it is possible to increase the degree of freedom for designing the lamp 809.

Figure 31:
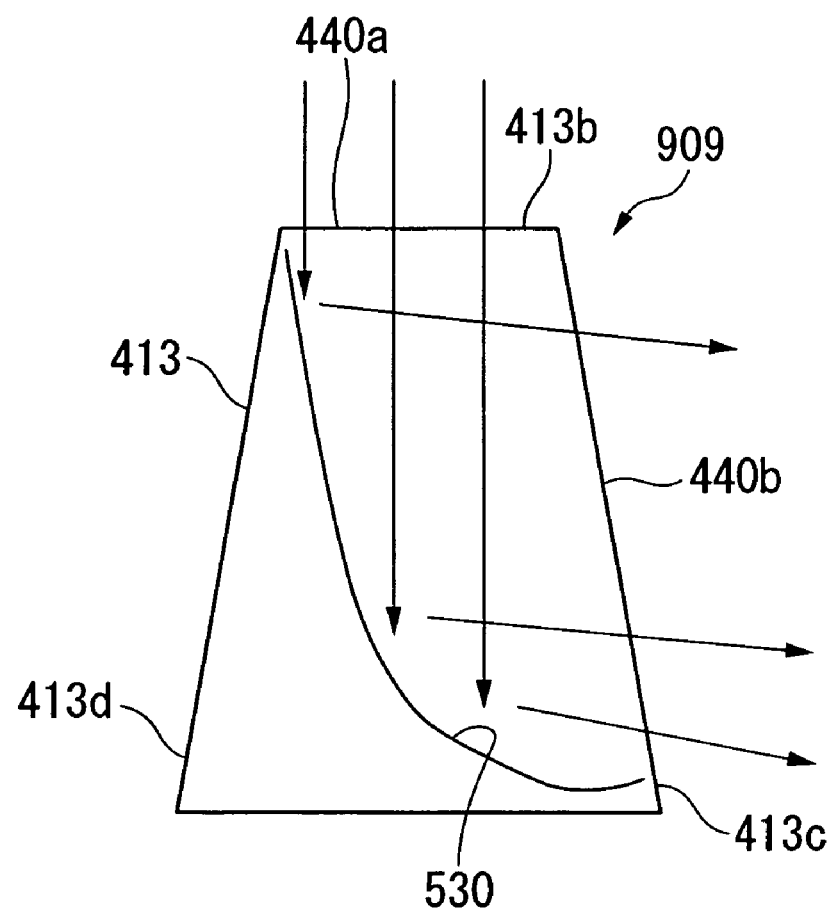
FIG. 31 shows a cross-sectional view of a lamp for a vehicle according to a ninth embodiment of the present invention.

In the above-mentioned embodiment, the mirror 430 is formed by a flat mirror; however, as shown in a ninth embodiment in FIG. 31 (new reference symbol 909 is applied to the lamp), a concave-curved mirror 530 is also applicable. In addition, as same as the embodiment shown in FIGS. 26 and 27, a plurality of external light emitting portions for irradiating light reflected by the mirror 530 to the outside of the vehicle may be provided on the lamp housing 413 so as to be distributed.

In addition, the reflecting direction (i.e., the irradiating direction) of light reflected by the mirror may be directed to the same illuminating directions of the lamps, that is, the forward or the rearward of the present vehicle.

Moreover, the present invention will not be limited only to the above-mentioned embodiments. Additions, omissions, substitutions, and other modifications can be made without departing from the spirit or scope of the present invention. For example, the reflection member for reflecting the external light can be arranged at location other than that mentioned in the above-embodiments (that is, the reflection member can be arranged at a suitable location where will not affect on light distributions in the lamp housing).

The present invention explained in the above can be summarized below.

A lamp for a vehicle of the present embodiment includes: a light source (the rear lamp 410 and the front lamp 411) for illuminating light to the outside of the present vehicle; a light-guiding member (the light-guiding member 414) which guides and illuminates input external light to a predetermined direction around a present vehicle, wherein the lamp for a vehicle is mounted on a front top portion of the vehicle roof (the roof 404).

According to the lamp for a vehicle, when external light such as sunlight or light from the street lamps enters into the external light entering portion of the light-guiding member, the light is guided through the light-guiding member to the predetermined direction around the present vehicle, and is then illuminated from the external light emitting portion. Accordingly, only the external light is irradiated to the around of the present vehicle when the light source is turned off, while light emitted from the lamp and the external light which is guided to the light-guiding member are irradiated to the around of the present vehicle when the light source is turned on. In addition, since the lamp for a vehicle is mounted on the front top portion of the vehicle roof, the light emitted from the light source and the external light illuminated through the light-guiding member are visible from the forward of the present vehicle, and are also visible from a driver in a high-view point vehicle approaching from the behind.

Accordingly, since the lamp is mounted on the front top portion of the vehicle roof, it is possible to obtain preferable visibility in both of the forward of the present vehicle and the rearward of the present vehicle (especially, from the high-view point vehicle approaching from the behind), without largely increasing the number of lamps. Furthermore, since the lamp for a vehicle is provided with the light-guiding member which guides the input external light to the predetermined direction around the present vehicle and illuminates, it is possible to obtain sufficiently high attention-attracting effect without increasing power consumption.

A lamp for a vehicle of the present invention includes: a light source for emitting light to the outside of the present vehicle; and a reflection member (the mirror 430) for reflecting input external light to the predetermined direction around the present vehicle, wherein the lamp for a vehicle is mounted on a front top portion of a vehicle roof.

According to the lamp for a vehicle, when external light such as sunlight or light from the street lamps enters into the external light entering portion of the reflection member, the light is reflected by the reflecting member and irradiates the predetermined direction around the present vehicle. Accordingly, only the external light reflected by the reflection member is irradiated to the around of the present vehicle when the light source is turned off, while light emitted from the lamp and light reflected by the reflection member are irradiated to the around of the present vehicle when the light source is turned on. In addition, since the lamp for a vehicle is mounted on the front top portion of the vehicle roof, the light emitted from the light source and the external light reflected by the reflection member are visible from the forward of the present vehicle, and are also visible from a driver in a high-view point vehicle approaching from the behind.

Accordingly, since the lamp for a vehicle is mounted on the front top portion of the vehicle roof, it is possible to obtain preferable visibility in both of the forward of the present vehicle and the rearward of the present vehicle (especially, from the high-view point vehicle approaching from the behind), without largely increasing the number of lamps. Furthermore, since the lamp for a vehicle is provided with the reflection member which reflects the input external light to the predetermined direction around the present vehicle, it is possible to obtain sufficiently high attention-attracting effect without increasing power consumption.

In the lamp for a vehicle according to the above (13) or (14), the light-irradiating direction of the light-guiding member or the reflection member directs the side of the present vehicle.

According to the lamp for a vehicle, sufficient amount of light can be illuminated to the side of the present vehicle without providing a lamp only for illuminating the side of the present vehicle. Therefore, it is possible to obtain sufficiently high attention-attracting effect in the side of the present vehicle, while reducing the power consumption. Especially, at the crossing or the like at the dusk or the night, it is possible to receive lights therearound and illuminates the side of the present vehicle; therefore, it is possible to cancel the confusing effect which is caused by the insufficient light amount, and attract higher attentions in the side direction of the present vehicle.

In the lamp for a vehicle according to one of the above (13) to (15), the light-irradiating direction of the light-guiding member or the reflection member directs the same direction as the light-irradiating direction of the light source.

According to the lamp for a vehicle, since the light-irradiating direction of light via the light-guiding member or the reflection member is directed to the same direction as the irradiating direction of the light source where the higher attention needs to be attracted, under a condition in which sufficient external light is available, it is possible to reduce the light emitted from the light source or turn off the light source. Accordingly, unnecessary power consumption can be decreased.

In the lamp for a vehicle according to one of the above (13) to (16), a plurality of the light-guiding members or a plurality of the external light emitting portions (the external light emitting portion 422a) of the reflection member is provided on an exterior of the lamp housing (the lamp housing 413) so as to be distributed.

According to the lamp for a vehicle, since the external light emitting portions are arranged and distributed on the exterior of the lamp housing, it is possible to increase the attention-attracting effect and to increase the degree of freedom in the design of the lamp for a vehicle.

In the lamp for a vehicle according to one of the above (13) to (17), the light-guiding member or the external light entering portion of the reflection member is arranged so as to direct the inside in the vehicle width direction.

According to the lamp for a vehicle, since the external light entering portion is arranged on a face facing the inside in the vehicle width where is hardly seen from the outside of the present vehicle, limitation in the degree of freedom in the design of the lamp for a vehicle can be further reduced. In addition, when the light-guiding member is employed, since refractions in the light-guiding member can be reduced, it is possible to reduce the attenuation of the input light in the light-guiding member, and to attract attentions with higher intensity light.

EXPLANATIONS FOR THE REFERENCE SYMBOLS

404 . . . a roof (vehicle roof); 409, 509, 609, 709, and 909 . . . a lamp (a lamp for a vehicle); 410 . . . a rear lamp (a light source); 411 . . . a front lamp (a light source); 413 . . . a lamp housing; 414 and 414A . . . a light-guiding member; 414a and 440a . . . an external light entering portion; 414b, 614b, and 440b . . . an external light emitting portion; 420 . . . an LED (a light source); 421 . . . a light-guiding plate (a light-guiding member); 422 . . . a rod-shaped member (a light-guiding member); 430 and 530 . . . a mirror (a reflection member).

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A lamp for a vehicle provided to a forward inclined face of a roof of the vehicle, the forward inclined face inclining downward and forward of the vehicle from a rooftop portion of the roof, the lamp for a vehicle comprising:
   a circuit-mounting portion, comprising a plate-shaped base portion mounted proximate an opening of a roof-molding attaching groove formed in the vehicle roof, and a protruding portion which protrudes downwardly from a lower face of the plate-shaped base portion at a substantially middle position thereon, wherein the protruding portion is fit into the roof molding attaching groove;
   a plurality of arrayed light sources which are attached to the circuit-mounting portion; and
   a translucent lamp cover which covers a top of the circuit-mounting portion and which comprises a light emitting face at least on a top face thereof;
   a first illuminating portion of the translucent lamp cover which irradiates a light rearward and upward in relation to a vehicle advancing direction so as not to be visible from a front of the vehicle; and
   a second illuminating portion of the translucent lamp cover which irradiates a light in a direction other than rearward and upward in relation to a following vehicle in a rear direction;
   wherein the first illuminating portion and the second illuminating portion are in different colors;
   wherein at least a height of a top of the lamp for a vehicle while being attached to the vehicle is set so as to be lower than the rooftop portion of the roof.

2. The lamp for a vehicle according to claim 1, wherein the lamp cover provides a light-guiding member which guides and irradiates an inputted external light to a first predetermined direction around the vehicle.

3. The lamp for a vehicle according to claim 1, further comprising a separation wall which is provided inside of the circuit-mounting portion and which demarcates between the first illuminating portion and the second illuminating portion.

4. The lamp for a vehicle according to claim 1, further comprising a limiting portion which limits a light-irradiating region of the first illuminating portion or the second illuminating portion.

5. The lamp for a vehicle according to claim 1, further comprising a polarizing device which changes an intensity of the light emitted from the first illuminating portion or the second illuminating portion, in accordance with irradiation angles.

6. The lamp for a vehicle according to claim 1, wherein intensities or colors of the first illuminating portion and the second illuminating portion differ from each other.

7. The lamp for a vehicle according to claim 1, wherein the first illuminating portion and the second illuminating portion can be illuminated independently from each other.

8. The lamp for a vehicle according to claim 1, further comprising a light-illuminating portion which directs a light to a side direction of the vehicle.

9. The lamp for a vehicle according to claim 8, wherein the light-illuminating portion is formed in a linear shape.

10. The lamp for a vehicle according to claim 1, wherein the top face of the lamp for a vehicle and a surface of the roof are formed so as to have a same height, and form a rooftop face by arranging the lamp for a vehicle onto the roof so as to be substantially flush with the surface of the roof.

11. A vehicle comprising the lamp for a vehicle according to claim 1 mounted on the roof thereof in front of a roof molding.

12. The lamp for a vehicle according to claim 1, wherein the first illuminating portion is red in color, and wherein the second illuminating portion is amber in color.

13. In a vehicle having a roof with a forward inclined face inclining downward and forward of the vehicle from a top of the roof, the roof having a roof-molding attaching groove formed therein, the improvement comprising a lamp apparatus for the vehicle, said lamp apparatus comprising:

a circuit-mounting portion, comprising a plate-shaped base portion mounted proximate an opening of a roof-molding attaching groove formed in the vehicle roof, and a protruding portion which protrudes downwardly from a lower face of the plate-shaped base portion at a substantially middle position thereon, wherein the protruding portion is fit into the roof molding attaching groove;

a plurality of arrayed light sources which are attached to the circuit-mounting portion; and a translucent or transparent lamp cover which covers a top of the circuit-mounting portion and which comprises a light emitting face at least on a top face thereof, said lamp cover comprising a first illuminating portion of the translucent lamp cover which irradiates a light rearward in relation to a vehicle advancing direction; and a second illuminating portion of the translucent lamp cover which irradiates a light in a direction other than rearward;

wherein the first illuminating portion is red in color, and wherein the second illuminating portion is amber in color; and wherein at least a height of a top of the lamp for a vehicle while being attached to the vehicle is set so as to be lower than the rooftop portion of the roof.

14. The vehicle according to claim 13, further comprising a separation wall which is provided inside of the circuit-mounting portion and which demarcates between the first illuminating portion and the second illuminating portion.

15. The vehicle according to claim 13, further comprising a limiting portion which limits a light-irradiating region of the first illuminating portion or the second illuminating portion.

16. The vehicle according to claim 13, further comprising a polarizing device which changes an intensity of light emitted from the first illuminating portion or the second illuminating portion, in accordance with irradiation angles.

17. The vehicle according to claim 13, wherein intensities or colors of the first illuminating portion and the second illuminating portion differ from each other.

18. The vehicle according to claim 13, wherein the first illuminating portion and the second illuminating portion can be illuminated independently of each other.

\* \* \* \* \*

UNITED STATES PATENT AND TRADEMARK OFFICE
CERTIFICATE OF CORRECTION

PATENT NO.        : 7,635,209 B2                                          Page 1 of 1
APPLICATION NO. : 11/656633
DATED             : December 22, 2009
INVENTOR(S)       : Uematsu et al.

It is certified that error appears in the above-identified patent and that said Letters Patent is hereby corrected as shown below:

Title page:
Item (75), "Inventors", please change "Wako" (both occurrences) to
--Utsunomiya-shi--.

Signed and Sealed this

Fifteenth Day of June, 2010

David J. Kappos
*Director of the United States Patent and Trademark Office*